US008656347B2

(12) United States Patent
Ito

(10) Patent No.: US 8,656,347 B2
(45) Date of Patent: Feb. 18, 2014

(54) GENERATION OF PARALLELIZED PROGRAM BASED ON PROGRAM DEPENDENCE GRAPH

(75) Inventor: Makiko Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 875 days.

(21) Appl. No.: 12/585,957

(22) Filed: Sep. 29, 2009

(65) Prior Publication Data
US 2010/0023731 A1    Jan. 28, 2010

Related U.S. Application Data

(63) Continuation of application No. PCT/JP2007/056916, filed on Mar. 29, 2007.

(51) Int. Cl.
*G06F 9/44* (2006.01)
(52) U.S. Cl.
USPC .......................................................... 717/106
(58) Field of Classification Search
None
See application file for complete search history.

(56) References Cited

U.S. PATENT DOCUMENTS 6,654,952 B1 * 11/2003 Nair et al. ..................... 717/157
6,817,013 B2 * 11/2004 Tabata et al. .................. 717/151

FOREIGN PATENT DOCUMENTS

| JP | 3028821 B | 2/2000 |
| JP | 3641997 | 2/2005 |
| JP | 2005-258920 | 9/2005 |

OTHER PUBLICATIONS

Hiroki Honda et al., "OSCAR-jo deno Fortran Program Kihon Block no Heiretsu Shori Shuho", The Transactions of the Institute of Electronics, Information and Communication Engineers, Sep. 25, 1990, vol. J73-D-I, No. 9, pp. 756 to 766, ISSN: 0915-1915.
Hiroki Honda, "OSCAR/Fortran Compiler", Information Processing Society of Japan Kenkyu Hokoku, Nov. 22, 1991, vol. 91, No. 100,pp. 1 to 12.
Kenji Kimura et al, "Single Chip Multi Processor-jo deno Kinsairyudo Heiretsu Shori", Transactions of Information Processing Society of Japan, May 15, 1999, vol. 40, No. 5, pp. 1924 to 1934, ISSN:0387-5806.
Kiyoshi Hayakawa et al., "On-chip Multi Processor-jo no Sairyudo Task-kan Doki no tameno PC-C Doki Kiko", The Institute of Electronics, Information and Communication Engineers 1998 Nen Joho System Society Taikai Koen Ronbunshu, Sep. 7, 1998, p. 34 (4 pp.).
David W. Wall"Limits of Instruction-Level Parallelism," Proceedings of the Fourth International conference on Architectural support for programming languages pp. 176-188 May 1991.

(Continued)

*Primary Examiner* — Henry Tsai
*Assistant Examiner* — Juanito Borromeo
(74) *Attorney, Agent, or Firm* — Staas & Halsey LLP

(57) ABSTRACT

A method of generating a parallelized program includes calculating an execution order of vertices of a degenerate program dependence graph, generating basic blocks by consolidating vertices including neither branching nor merging, generating procedures each corresponding to a respective one of the vertices, and generating a procedure control program by arranging an instruction to execute a first procedure after an instruction to wait for output data transfer from a second procedure for a dependence relation crossing a border between the basic blocks, generating an instruction to register a dependence relation that a third procedure has on output data transfer from a fourth procedure for a dependence relation within one of the basic blocks, and generating an instruction to perform a given data transfer directly from procedure to procedure for each of a data transfer within one of the basic blocks and a data transfer crossing a border between the basic blocks.

10 Claims, 31 Drawing Sheets

(56) References Cited

OTHER PUBLICATIONS

S. Horwitz, J. Prins, and T. Reps, "Integrating Non-Interfering Versions of Programs," ACM Transactions on Programming Languages and Systems, vol. 11, No. 3, pp. 345-387, 1989.

Jeanne Ferrante, Karl J. Ottenstein, Joe D. Warren, "The Program Dependence Graph and Its Use in Optimization," ACM Transactions on Programming Languages and Systems, pp. 319-419, vol. 9 No. 3, Jul. 1987.

Susan Horwitz, Jan Prins, Thomas Reps, "On the Adequacy of Program Dependence Graphs for Representing Programs," Proceedings of the $15^{th}$ Annual ACM Symposium on the Principles of Programming Languages, pp. 146-157, Jan. 1988.

Nakata Ikuo, "Configuration and Optimization of Compiler," Asakura Shoten, 320-383, 1999.

Choi, J., Cytron, R., and Ferrante, J. ,"Automatic Construction of Sparse Data Flow Evaluation Graphs", In Proceedings of the 18th ACM SIGPLAN-SIGACT Symposium on Principles of Programming Languages (Orlando, Florida, United States, Jan. 21-23, 1991).

POPL '91. ACM, New York, NY, pp. 55-66. DOI= http://doi.acm.org/10.1145/99583.99594.

Cytron, R., Ferrante, J., Rosen, B. K., Wegman, M. N., and Zadeck, F. K. ,"Efficiently Computing Static Single Assignment Form and the Control Dependence Graph," ACM Trans. Program. Lang. Syst. 13, 4 (Oct. 1991), 451-490. DOI= http://doi.acm.org/10.1145/115372.115320.

P Briggs, KD Cooper, TJ Harvey, LT Simpson, "Practical improvements to the Construction and Destruction of Static Single Assignment form,", Software—Practice and experience, 1998.

Chow, F., Chan, S., Kennedy, R., Liu, S., Lo, R., and Tu, P.,"A New Algorithm for Partial Redundancy Elimination Based on SSA Form," In Proceedings of the ACM SIGPLAN 1997 Conference on Programming Language Design and Implementation(Las Vegas, Nevada, United States, Jun. 16-18, 1997). A. M. Berman, Ed. PLDI '97. ACM, New York, NY,273-286. DOI=http://doi.acm.org/10.1145/258915.258940.

International Search Report mailed May 1, 2007 and issued in corresponding International Patent Application PCT/JP2007/056916.

* cited by examiner

GENERATION OF PARALLELIZED PROGRAM BASED ON PROGRAM DEPENDENCE GRAPH

CROSS-REFERENCE TO RELATED APPLICATIONS

This is a continuation of International Application No. PCT/JP2007/056916, filed on Mar. 29, 2007, the entire contents of which are hereby incorporated by reference.

FIELD

The disclosures herein generally relate to program generation methods, apparatuses, and programs, and relate to a parallelized program generation method, apparatus, and program.

BACKGROUND

In recent years, performance of programs on single processor is approaching the limits. In order to improve performance, the clock frequency of the processor may be increased to increase processing volume per unit time, or instructions may be executed in parallel to increase the number of simultaneously executed processes.

An increase in clock frequency gives rise to a problem of an increase in power consumption. Also, there is a physical limit as to how much the clock frequency can be increased. Further, instruction level parallelism of general program is up to 2 to 4 (Non-Patent Document 1). Although parallelism may be increased by introducing speculative execution, such an increase is also known to have its own limits.

Against this background, attention has been focused on a method that parallelizes a program at a granularity coarser than the instruction level for execution by a plurality of processors to improve processing performance. There is no known standardized method, however, that converts a sequential program having a large number of control branches into a viable parallelized program.

Major program parallelization methods are a data-level parallelization method with a focus on loops and a speculative thread execution method with a focus on control.

Patent Document 1 discloses analyzing data dependence relations in a loop, divides an array, and allowing loop processes to be executed by plural processors. This method is effective when there are many regular loop processes such as numerical computations.

Patent Document 2 discloses focusing attention on branches appearing in a sequential program and converting these branches into speculative thread executions. Since this method parallelizes a program based on control flow, it may not be able to sufficiently extract the parallelism that potentially exists in the program. Further, multiprocessors having no mechanism for speculative thread execution may suffer a large rollback cost at the time of prediction failure. This method is thus not suitable for an application in which a rate of successful branch prediction is low.

Accordingly, it is preferable to provide a method that parallelizes a sequential program of a vast scale to generate a non-speculative multi-thread program (i.e., parallelized program) that effectively runs on multiprocessors. A parallelized program generated in such a manner may need to take into account an issue of waiting time caused by dependence relations between threads as will be described in the following.

Methods that control thread execution in a parallelized program may include a method of executing threads in parallel by calling procedures as asynchronous remote calls, a method of executing threads in parallel by transmitting messages indicative of start of execution to procedures, a method of executing threads by utilizing a shared memory between threads to exchange input/output variables, etc. In these methods, a first procedure (i.e., thread) may produce an execution result that is used by a second procedure. In such a case, an instruction to wait for the completion of the first procedure and an instruction to execute the second procedure may be arranged at proper locations in the program by taking into account the length of time required for executing other procedures and the like. If the first procedure is completed earlier than expected, a needless waiting time may occur until the start of execution of the second procedure.

FIG. 1 is a drawing for illustrating the occurrence of a needless waiting time. In FIG. 1, four processors PROCESSOR-0 through PROCESSOR-3 are used. PROCESSOR-0 executes a thread control program 1, which is a program for controlling each thread as to its execution and a wait for completion of execution. In an example illustrated in FIG. 1, PROCESSOR-0 successively requests PROCESSOR-1 through PROCESSOR-3 to execute procedures A through C (i.e., start A( ) to start C( )), respectively. PROCESSOR-0 then waits for the completion of procedure A (i.e., wait A( )) before requesting the execution of procedure D (i.e., start D( )) that is to use the result of execution of procedure A. PROCESSOR-0 then waits for the completion of procedure B (i.e., wait B( )) before requesting the execution of procedure E (i.e., start E( )) that is to use the result of execution of procedure B. PROCESSOR-0 then waits for the completion of procedure C (i.e., wait C( )) before requesting the execution of procedure F (i.e., start F( )) that is to use the result of execution of procedure C.

In this example, a wait occurs between the completion of procedure C and the request of execution of procedure F. This is because the wait for the completion of procedure B (i.e., wait B( )) and the request of execution of procedure E (i.e., start E( )) are situated before the wait for the completion of procedure C (i.e., wait C( )) and the request of execution of procedure F (i.e., start F( )) in the thread control program. Due to such instruction sequence, the wait for the completion of procedure C and the request of execution of procedure F are not performed until the completion of procedure B.

This instruction sequence is based on an expectation that procedure B will be completed before procedure C. If it is known in advance that procedure C will be completed before procedure B, the wait for the completion of procedure C and the request of execution of procedure F may be placed before the wait for the completion of procedure B and the request of execution of procedure E. In reality, however, the time required for procedure execution depends on the contents of processed data and the like, so that in many cases it may be impossible to accurately predict the completion time. Accordingly, the above-noted methods that utilize simplistic remote procedure calls, shared-memory-based threads, message transmissions, and the like may not be able to eliminate a waiting time as illustrated in FIG. 1.

The applicant of the present application has developed an asynchronous remote procedure call method with a dependence-relation-based wait, which specifies dependence relations between procedures as execution conditions on a procedure-specific basis. For the control of execution of threads in a parallelized program, the procedures are entered into an execution queue, and are executed upon their corresponding execution conditions being satisfied. Such a method is referred to as an asynchronous remote procedure call method with a dependence-relation-based wait.

FIG. 2 is a drawing illustrating the control of procedure execution by use of the asynchronous remote procedure call method with a dependence-relation-based wait. In FIG. 2, four processors PROCESSOR-0 through PROCESSOR-3 are used. PROCESSOR-0 executes a thread control program 2, which is a program for controlling each thread as to its execution and dependence relations. In so doing, PROCESSOR-0 executes a procedure call program 3 to control the procedures defined in the thread control program 2 by use of queues corresponding to the processors.

In the example illustrated in FIG. 2, procedure A is entered into an execution queue 4 of PROCESSOR-1 in accordance with the instruction "start A( )" in the control program 2. Further, procedure B is entered into an execution queue 5 of PROCESSOR-2 in accordance with the instruction "start B( )" in the control program 2. Moreover, procedure C is entered into an execution queue 6 of PROCESSOR-3 in accordance with the instruction "start C( )" in the control program 2.

Similarly, procedures D, E, and F are entered into the execution queues 4 through 6, respectively, in accordance with the instructions "start D( )", "start E( )", and "start F( )" in the control program 2. The thread control program 2 includes the instruction "dep(x, y, . . . )" that specifies dependence relations, and, in this instance, indicates that procedure x depends on procedure Y and others listed. Namely, this instruction specifies that the executions of procedure Y and others listed need to be completed before the execution of procedure X. In accordance with the instruction "dep(D, A)" in the control program 2, dependence of procedure D on procedure A is registered to the execution queue 4 of PROCESSOR-1. In accordance with the instruction "dep(E, A, B)" in the control program 2, further, dependence of procedure E on procedures A and B is registered to the execution queue 5 of PROCESSOR-2. In accordance with the instruction "dep(F, A, C)" in the control program 2, moreover, dependence of procedure F on procedures A and C is registered to the execution queue 6 of PROCESSOR-3.

In this manner, procedures entered into the execution queues provided for the respective processors are executed by corresponding processors in sequence as defined by positions in the queues. In so doing, procedures for which no dependency is registered (i.e., procedures indicated as "NULL" in FIG. 2) are unconditionally executed. Procedures for which dependency is registered are executed upon detecting the completion of execution of referenced procedures. The provision of a queue for each processor and the successive execution of procedures for which execution conditions are satisfied (i.e., executable procedures) make it possible to eliminate the waiting time as illustrated in FIG. 1, for example.

As described above, the use of the asynchronous remote procedure call method with a dependence-relation-based wait makes it possible to prevent the occurrence of a needless waiting time at the time of parallelized program execution, for example. Accordingly, when a sequential program of a vast scale is to be parallelized to generate a non-speculative parallelized program that effectively runs on multiprocessors, it is preferable to generate a parallelized program that is suitable for the asynchronous remote procedure call method with a dependence-relation-based wait as described above.

The applicant of the present application has already developed a parallelized program generation method that is applicable to the asynchronous remote procedure call method with a dependence-relation-based wait. In this parallelized program generation method, a sequence in which program instructions are executed is analyzed to produce a basic block, which is comprised of nodes that are sequentially executed without including branches (i.e., IF, GOTO, LOOP, and so on) and merging. Procedures having dependence relations with each other within the similar basic block are executed by use of asynchronous remote procedure calls with a dependence-relation-based wait. As for dependence relations between procedures across different basic blocks, a subsequent procedure is executed after waiting for the completion of a preceding procedure. With such a configuration, the generation of control programs is made easier by implementing procedure execution based on a wait mechanism with respect to complex control dependence relations between basic blocks, and, also, a needless waiting time is eliminated by use of an asynchronous remote procedure call with a dependence-relation-based wait within the similar basic block in which execution sequence is fixed.

In the parallelized program generation method described above, data transfer between processors across different basic blocks may be always performed by a control processor (e.g., PROCESSOR-0 in FIG. 2) or by a data transfer unit operating under the control of the control processor. Namely, data is first transferred from a first processor performing a procedure to the control processor (or the data transfer unit), and, then, is transferred from the control processor (or the data transfer unit) to a second processor performing a procedure. This arrangement is used because the central control of operations by the control processor is a relatively easy way to achieve proper data transfer under the conditions in which data to be transferred may differ depending on the results of a condition check in the original sequential program, and in which the execution of procedures in sequence may have dependence relations. Such a configuration in which the control processor intervenes for each data transfer, however, makes program execution inefficient, thereby creating needless delays in the execution of processes. Accordingly, it is preferable to perform data transfer across basic blocks directly between procedure executing processors without using an intervening control processor, thereby attaining efficiency in parallelized program execution.

[Patent Document 1] Japanese Patent No. 3028821
[Patent Document 2] Japanese Patent No. 3641997
[Non Patent Document 1] David W. Wall. Limits of Instruction-Level Parallelism. Proceedings of the fourth international conference on Architectural support for programming languages pp. 176-188 May. 1991.
[Non Patent Document 2] S. Horwitz, J. Prins, and T. Reps, "Integrating non-interfering versions of programs," ACM Transactions on Programming Languages and Systems, vol. 11, no. 3, pp. 345-387, 1989.
[Non Patent Document 3] Jeanne Ferrante, Karl J. Ottenstein, Joe D. Warren, "The Program Dependence Graph and Its Use in Optimization," ACM Transactions on Programming Languages and Systems, pp. 319-419, vol. 9 no. 3, July 1987.
[Non Patent Document 4] Susan Horwitz, Jan Prins, Thomas Reps, "On the adequacy of program dependence graphs for representing programs," Proceedings of the 15th Annual ACM Symposium on the Principles of Programming Languages, pp. 146-157, January, 1988.
[Non Patent Document 5] Nakata Ikuo, "Configuration and Optimization of Compiler," Asakura Shoten, 1999

SUMMARY

According to an aspect of the embodiment, a method of generating a parallelized program includes: generating a program dependence graph from a sequential program, the program dependence graph having vertices representing statements constituting the sequential program and edges between the vertices representing relations between the statements; merging the vertices of the program dependence graph to generate a degenerate program dependence graph in which a number of vertices is reduced; calculating an execution order of vertices of the degenerate program dependence graph; generating basic blocks each of which is made by consolidating vertices including neither branching nor merging and to be executed in sequence among the vertices for which the execution order has been calculated; generating procedures each corresponding to a respective one of the vertices of the degenerate program dependence graph; and generating a procedure control program by arranging an instruction to execute a first one of the procedures after an instruction to wait for output data transfer from a second one of the procedures for the first and second ones of the procedures that have a dependence relation crossing a border between the basic blocks, generating an instruction to register a dependence relation that a third one of the procedures has on output data transfer from a fourth one of the procedures for the third and fourth ones of the procedures that have a dependence relation within one of the basic blocks, and generating an instruction to perform a given data transfer directly from procedure to procedure and an instruction to register a dependence relation on a preceding procedure of the given data transfer for each of a data transfer within one of the basic blocks and a data transfer crossing a border between the basic blocks, wherein the generated procedure control program is to control execution of the procedures.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, outlines and embodiments of a parallelized program generation method will be described with reference to the accompanying drawings.

Figure 3:
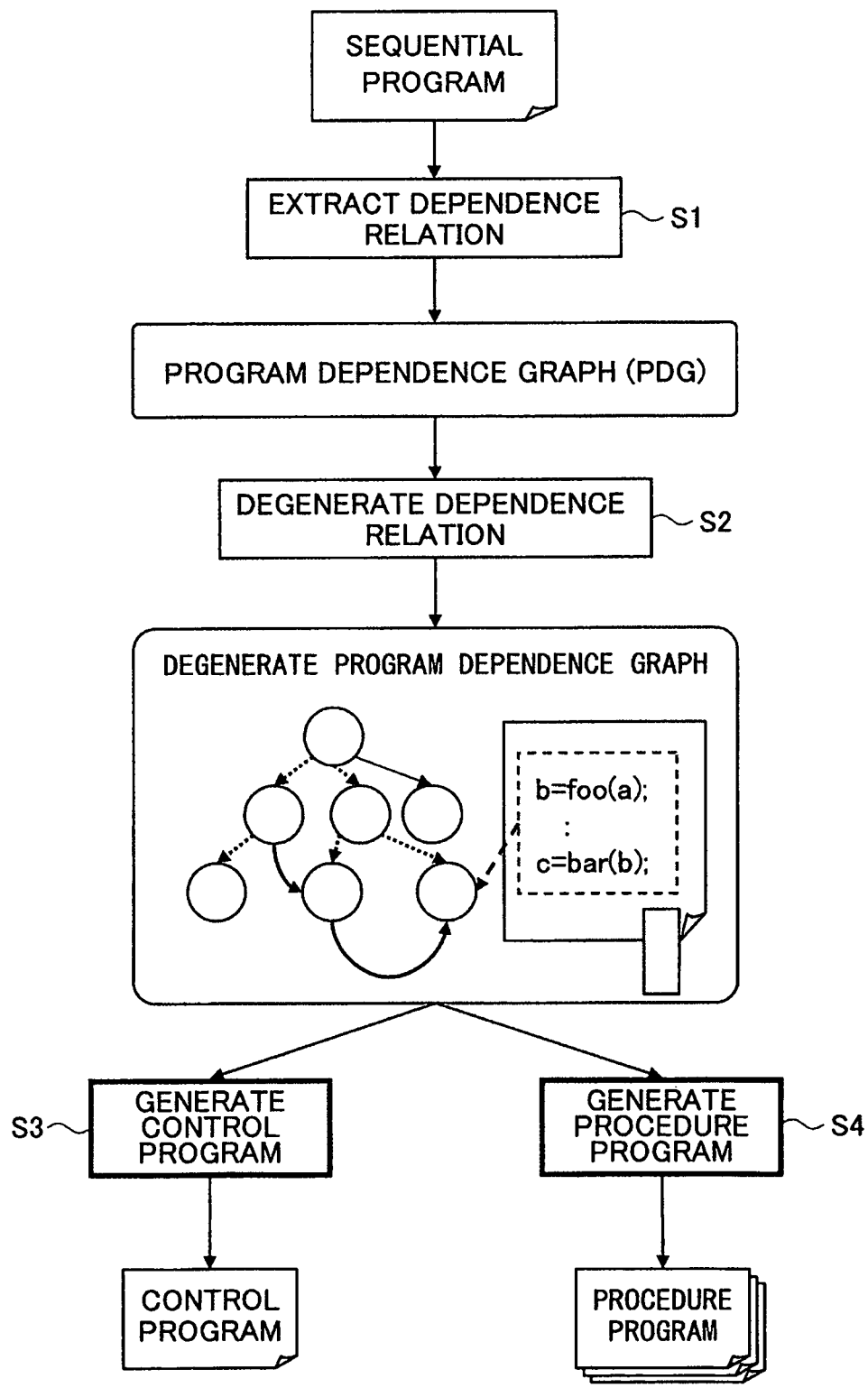
FIG. 3 is a drawing illustrating an outline of a parallelized program generation method.

FIG. 3 is a drawing illustrating an outline of a parallelized program generation method.

In step S1, a program dependence graph is generated from a sequential program. In step S2, dependence relations are degenerated until the amount of processing becomes suitable for other processor elements to execute as procedures, thereby generating a degenerate program dependence graph having procedures as its vertices. In step S3, a procedure control program for nonspeculatively controlling activation and synchronization of procedures is generated from the degenerate program dependence graph. In step S4, a procedure program corresponding to each vertex is generated from the degenerate program dependence graph.

In the following, a description will be first given of the process of generating a program dependence graph from a sequential program (i.e., step S1 of FIG. 3).

The program dependence graph is a graph that has program statements as its vertices, with relations between the statements represented by edges, as described in Non-Patent Documents 2 through 4. The program dependence graph disclosed in Non-Patent Documents 2 through 4 is represented by a set V of vertices and a set E of edges as described in the following, and is generated by analyzing a sequential program.

[V: Vertex Set]

Entry: representing a start point of a program.

Initial Definition: representing definitions of initial values at the start of the program.

Predicate: representing a condition check in either "If-then-else" or "while-loop".

Assignment Statement: representing an assignment statement in a program.

Last Use: representing reference to variables at the end of the program.

[E: Edge Set]

[Control Dependence Edge: $v \rightarrow_c^L w$] The control dependence edge represents whether to reach vertex w depending on the result of a condition check performed with respect to predicate vertex v. L represents a condition check flag. In the case of L=T, vertex w is executed in response to the result of the condition check being true. In the case of L=F, vertex w is executed in response to the result being false.

[Data Dependence Edge]

[Loop-Independent Flow Dependence Edge: $v \rightarrow_{li}^x w$] This edge represents a data dependence relation observed when the value of variable x assigned at vertex v is referred to at vertex w. This edge represents only the case in which a loop does not carry dependence, for example.

[Loop-Carried Flow Dependence Edge: $v \rightarrow_{lc(L)}^x w$] This edge represents a data dependence relation observed when the value of variable x assigned at vertex v is referred to at vertex w. This edge represents the case in which a loop L carries dependence.

[Def-Order Relation: $V \rightarrow_{lc(L)}^x w$] This edge represents an order relation between vertex v and vertex w in such a case that vertex v and vertex w assign a value to variable x, which is referred to by vertex u. This represents an order in which v and w are executed when either v, w, and u may be executed in this order or v and u are executed in this order, depending on control flow.

In the following, a description will be given of the process of generating a degenerate program dependence graph (i.e., step S2 of FIG. 3).

In a general program dependence graph as described above, vertices correspond to statements or assignment expressions. With each vertex corresponding to a statement or assignment expression, a software program of a vast scale may end up resulting in a few thousands to a few tens of thousands of vertices being provided in the graph. It is known that, in general, the amount of computation in optimization of a compiler by use of a graph increases exponentially with the size of the graph. Analysis may be possible when the graph has only a few tens of vertices with respect to a few procedures, for example. It is difficult, however, to perform optimization for the entirety of software having a realistic size.

In order to reduce the number of vertices and edges in a program dependence graph, dependence relations in the program dependence graph are degenerated to merge vertices, thereby creating a coarse-granularity program dependence graph. The size of the graph is reduced to 1/10 to 1/100 through degeneration of dependence relations, so that it may become possible to optimize the program in a realistic time scale.

The degeneration of dependence relations is performed by obtaining a set of degenerable dependence relations and vertices, followed by removing the dependence relations to merge these vertices into one vertex as described in the following.

1. Degeneration Based on Semantic Rules

It is generally alleged that reconstructing the control flow of an equivalent sequential program from a program dependence graph is difficult. This is because the expression includes only control dependence relations, for example, so that it may be impossible to uniquely determine a control flow that satisfies the dependence relations. Further, when optimization to transform a graph is performed, there may be no control flow that satisfies the dependence relations.

It is known, however, that the control flow of a program may be reconstructed if the program control structures included in the expression are limited to an "if" statement, a "while" statement, and an assignment statement and if the control dependence subgraph (i.e., subgraph comprised only of vertices and control dependence edges) of the program dependence graph has a tree structure (see Non-Patent Document 2), for example. In consideration of this, a program block is obtained which has only one entry point and one exit point with respect to a control statement in the program that is neither an "if" statement nor a "while" statement, for example. The entirety of the block and the dependence relations inside the block are degenerated into one vetex, thereby generating a degenerate program dependence graph for which a control flow may be safely reconstructed.

2. Degeneration Based on Degree of Linkage

A search is conducted in a program dependence graph to obtain the strength of linkages between vertices. It is defined that the degree of linkage is computed from a data dependence edge, its size, a control dependence edge, and the size of processing. When vertices having a degree of linkage larger than a predetermined degree satisfy the conditions for degeneration, these vertices are merged to degenerate the dependence relations. Degeneration by merging vertices may be possible if both of the following two conditions are satisfied:

1) a branch from outside a vertex set to inside the vertex set on the control flow graph CFG corresponding to the program dependence graph is directed only to a head vertex, for example, and a branch from inside the vertex set to outside the vertex set originates only from the last vertex in the vertex set; and 2) no outside vertex is included in a data dependence path between vertices.

As described above, the use of "degeneration based on syntax rules" or "degeneration based on a degree of linkage" makes it possible to generate a degenerate program dependence graph in which the number of vertices is significantly reduced, for example. A degenerate program dependence graph includes the following elements.

[V: Vertex Set]

Entry: representing a start point of a program.

Initial Definition: representing definitions of initial values at the start of the program.

Predicate: representing a condition check in either "If-then-else" or "while-loop".

Statement Set: representing a set of statements constituting the program.

Last Use: representing reference to variables at the end of the program.

[E: Edge Set]

[Control Dependence Edge: $V \rightarrow_c^L w$] The control dependence edge represents whether to reach vertex w depending on the result of a condition check performed with respect to predicate vertex v. L represents a condition check flag. In the case of L=T, vertex w is executed in response to the result of the condition check being true. In the case of L=F, vertex w is executed in response to the result being false.

[Data Dependence Edge]

[Loop-Independent Flow Dependence Edge: $v \rightarrow_{li}^{x} w$] This edge represents a data dependence relation observed when the value of variable x assigned at vertex v is referred to at vertex w. This edge represents only the case in which a loop does not carry dependence, for example.

[Loop-Carried Flow Dependence Edge: $v=_{lc(L)}^{x} w$] This edge represents a data dependence relation observed when the value of variable x assigned at vertex v is referred to at vertex w. This edge represents the case in which a loop L carries dependence.

[Def-Order Relation: $v \rightarrow_{lc(L)}^{x} w$] This edge represents an order relation between vertex v and vertex w in such a case that vertex v and vertex w assign a value to variable x, which is referred to by vertex u. This represents an order in which v and w are executed when either v, w, and u may be executed in this order or v and u are executed in this order, depending on control flow.

In the following, a description will be given of the process of generating a procedure control program (i.e., step S3 of FIG. 3) and the process of generating a procedure program (i.e., step S4 of FIG. 3).

A description will first be given of the process of generating a procedure program. A vertex of a degenerate program dependence graph generated as described above is a subset of statements included in the original sequential program, and includes information about control flows between the statements. In consideration of this, one procedure program is generated for one vertex by using as inputs the variables represented by data flow edges incident to a vertex of interest and using as outputs the variables represented by data flow edges emanating from the vertex of interest. Further, procedure program statements are generated from the control flows, and local variables necessary for the execution of these statements are also generated.

Figure 4:
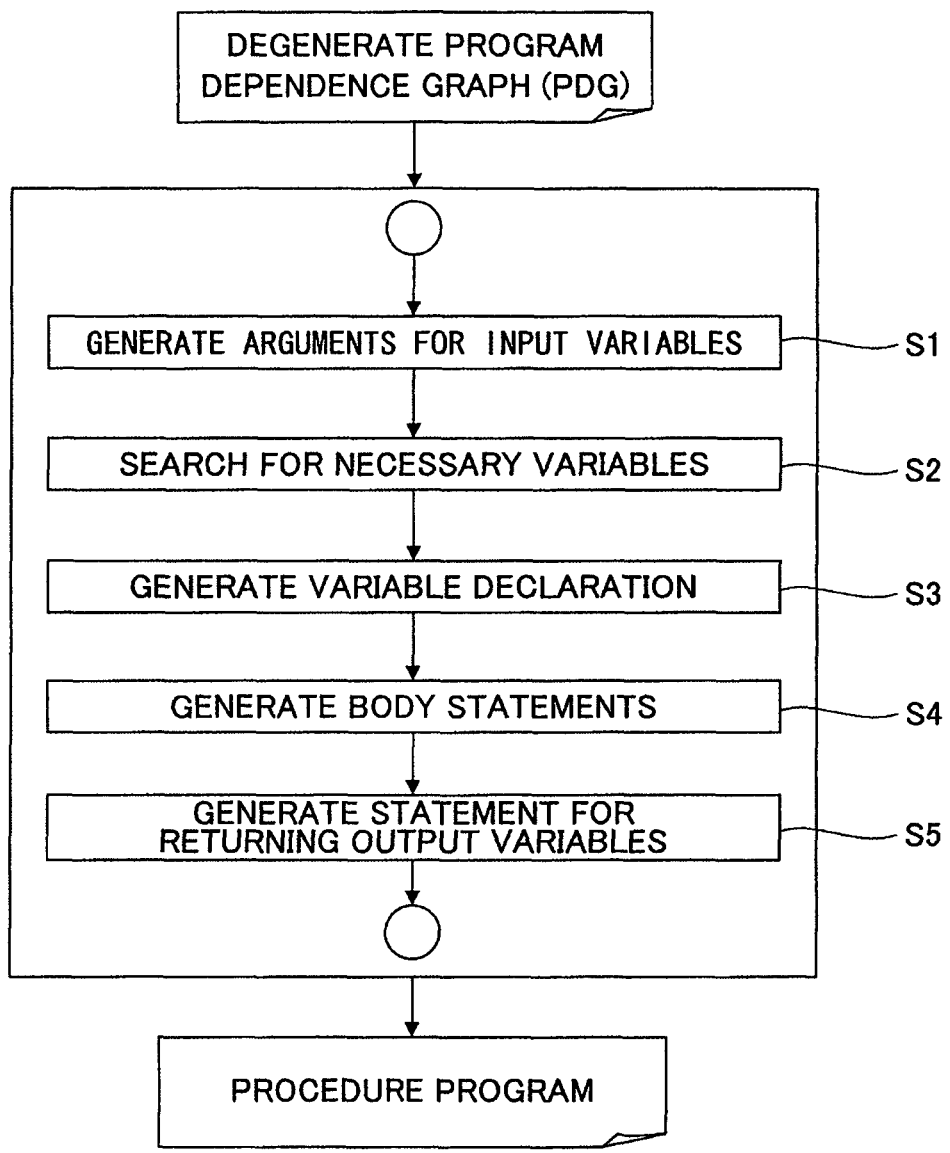
FIG. 4 is a drawing illustrating an outline of a procedure program generation method.
Figure 5:
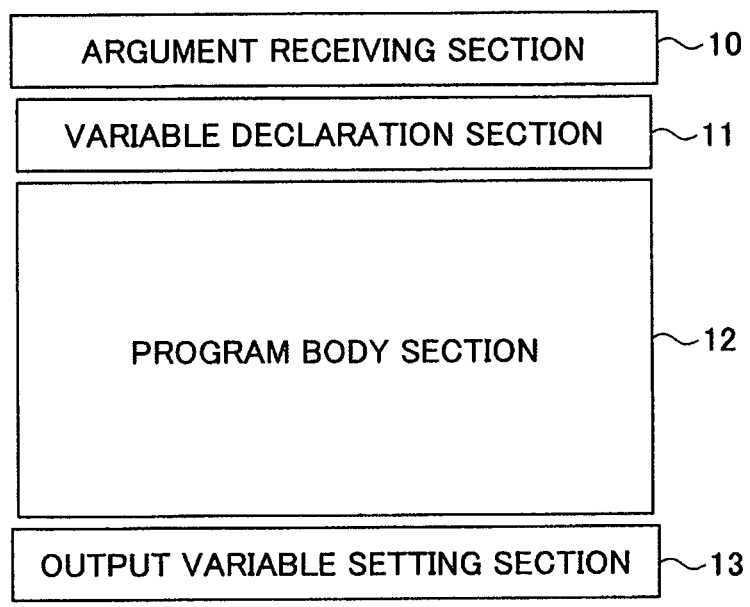
FIG. 5 is a drawing illustrating a procedure program generated by the procedure program generation method of FIG. 4.

FIG. 4 is a drawing illustrating an outline of a procedure program generation method. FIG. 5 is a drawing illustrating a procedure program generated by the procedure program generation method of FIG. 4.

In step S1 of FIG. 4, a subprogram for receiving input variables as arguments is generated where the input variables are variables represented by data flow edges incident to a vertex of interest. As a result, an argument receiving section 10 for receiving input variables is generated as illustrated in FIG. 5. In step S2, necessary variables are searched for. In step S3, a variable declaration is generated with respect to the variables that are found by the search. As a result, a variable declaration section 11 is generated as illustrated in FIG. 5.

In step S4, program statements are generated based on the information about control flows between statements corresponding to the vertex of interest. As a result, a program body section 12 is generated as illustrated in FIG. 5. In step S5, a subprogram for returning as outputs the variables represented by data flow edges emanating from the vertex of interest is generated. As a result, an output variable setting section 13 is generated as illustrated in FIG. 5.

In this manner, a procedure program corresponds to a procedure for executing a statement or a set of statements represented by a vertex. Further, the procedure is configured such that input variables are received as its arguments, and such that output variables are returned as values or stored at addresses that are received as arguments A description will next be given of the process of generating a procedure control program. A control flow may safely be reconstructed from a degenerate program dependence graph based on the technique disclosed in None-Patent Document 2. Specifically, the order of program executions is calculated with respect to a control dependence sub-tree of the degenerated program dependence graph to obtain a basic block. The basic block is a series of vertices that are sequentially executed without including branches (i.e., IF, GOTO, LOOP, and so on) and merging. A parallel program is generated by producing a control structure represented by each intermediate node and a program for calling a procedure represented by a child vertex. Further, codes are generated which are used to transfer input data necessary for execution of the procedure, to transfer data indicative of output results, and to make a rendezvous for these data sets. A dependence-relation-based wait mechanism is used to control procedure calls and data-transfer dependence relations inside a basic block.

Figure 1:
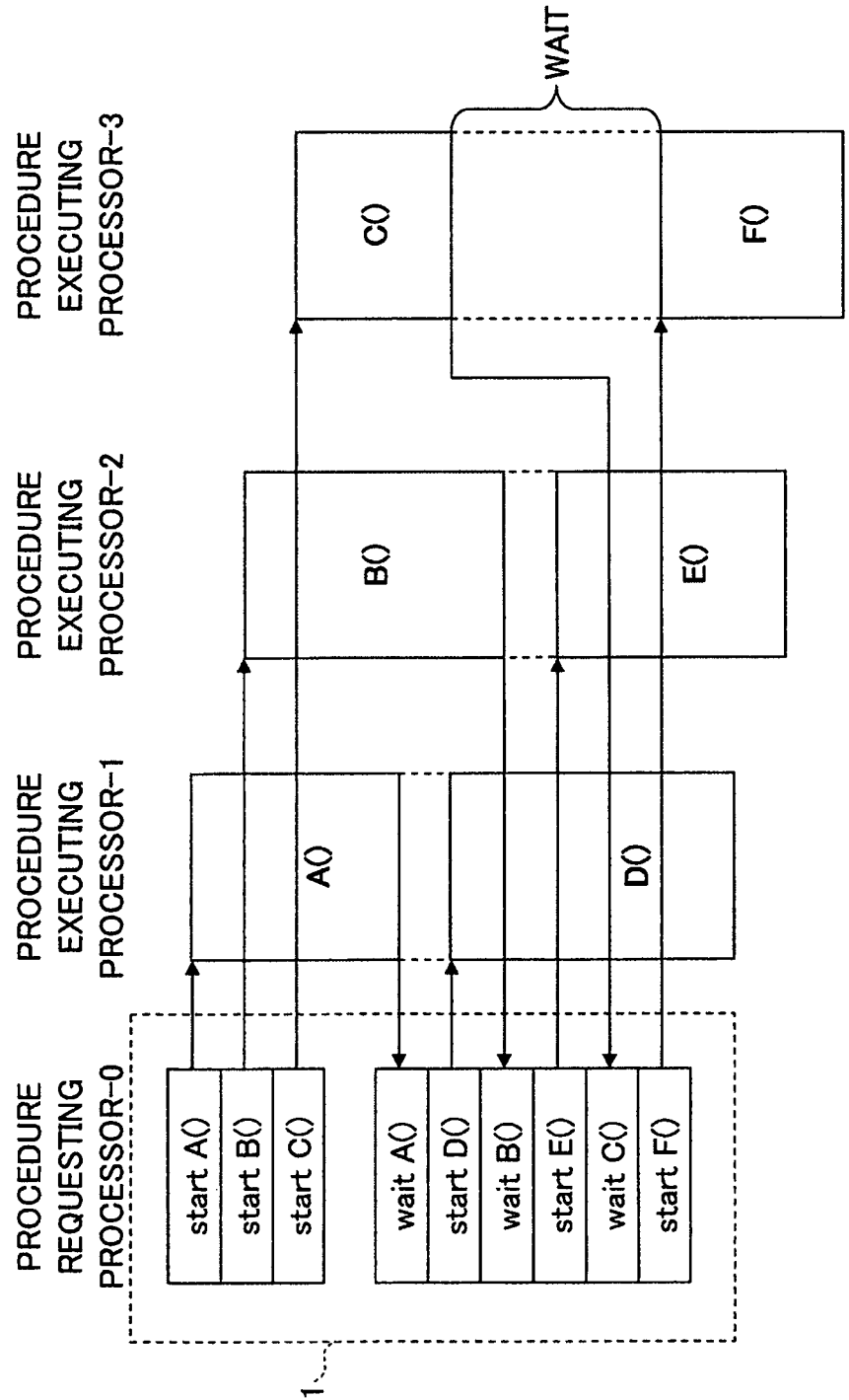
FIG. 1 is a drawing for illustrating the occurrence of a needless waiting time.
Figure 2:
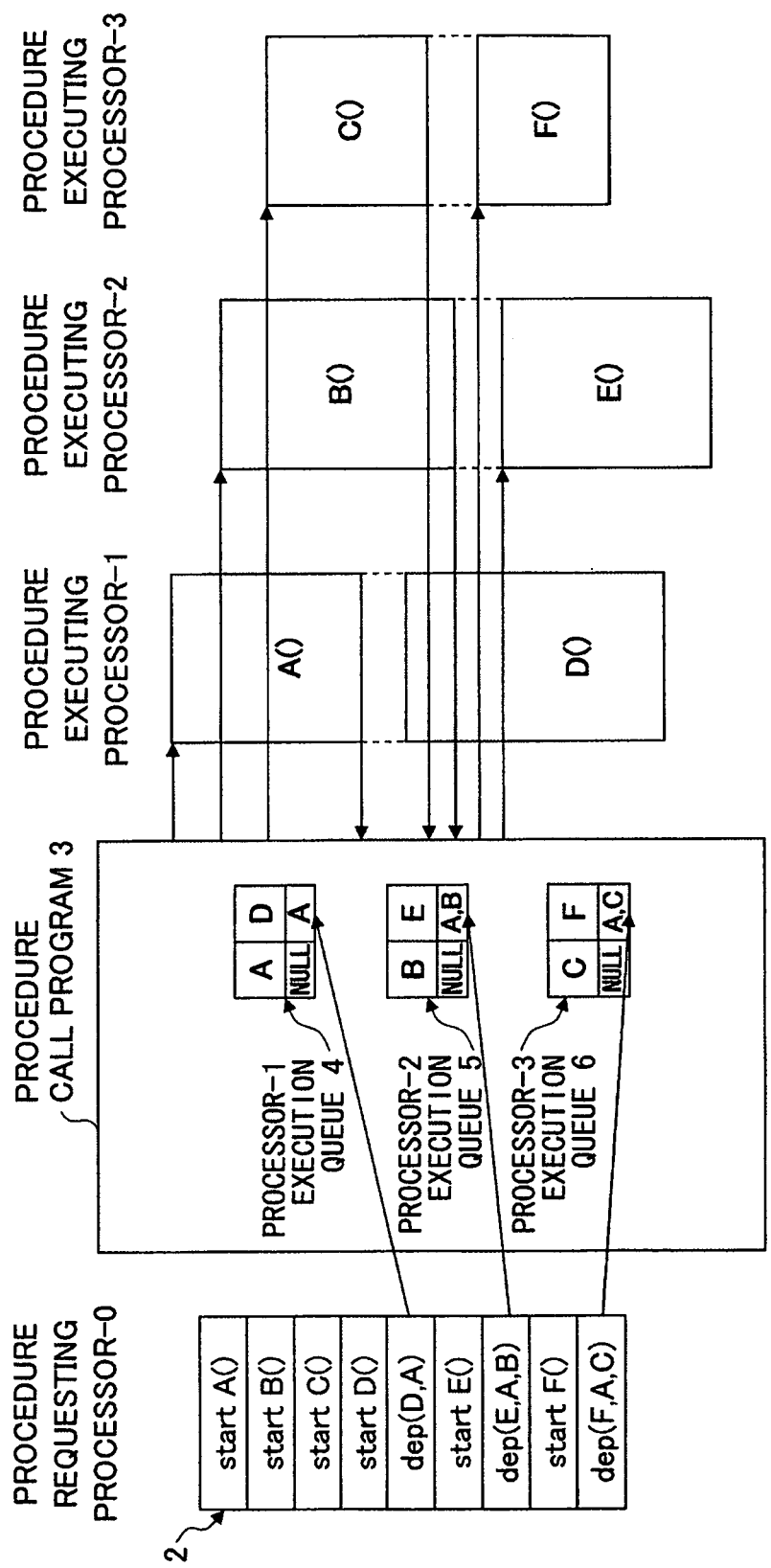
FIG. 2 is a drawing illustrating the control of procedure execution by use of an asynchronous remote procedure call method with a dependence-relation-based wait.

In program execution, a procedure requesting processor (i.e., control processor) executes a control program, and each procedure executing processor executes each procedure program called by the control program, similarly to the manner illustrated in FIG. 2. Each procedure program corresponds to a procedure for executing a statement or a set of statements represented by a vertex as previously described. A mechanism for performing procedure call, dependence relation registration, and procedure execution are similar to the mechanism illustrated in FIG. 2. Namely, the control processor registers procedures and dependence relations to queues that are provided separately for each of the processors and controlled by the procedure call program 3, and the procedures are successively executed upon becoming executable.

Input data for a procedure may be transferred from the control processor to the executing processor. When the results of a preceding procedure are to be utilized, however, data is directly transferred from the processor executing this procedure to a processor executing the next following procedure. In so doing, there may be a case in which proper data may need to be selected from a plurality of data sets depending on the result of a condition check in the control program, which corresponds to a condition check in the original sequential program. Such data selection is controlled by use of data-transfer dependence relations.

The multiprocessor system to be used for execution may utilize a shared memory. In such a case, input and output data for a given procedure are transferred to a memory area used by a processor, which then performs computation by use of this memory area, followed by transferring the results of computation to another proper memory area. A method of data variable allocation in this case includes: 1) a method of generating a copy area for a variable to be used on a processor-specific basis; and 2) a method of generating a copy area for a variable to be used on a procedure-specific basis. With the method of generating a variable copy area on a processor-specific basis, a memory area used by a given processor will have only one area for one variable x when a first procedure and a second procedure executed by this processor use the similar variable x. With the method of generating a variable copy area on a procedure-specific basis, for example, a memory area used by a given processor will have an area for variable x of a first procedure and another area for variable x of a second procedure when the first procedure and the second procedure executed by this processor use the similar variable x.

There may be a third method that is the combination of these two methods. Namely, a copy area for a variable to be used may be created on a processor-specific basis as a default, with an option to create separate areas on a procedure-specific basis if it may be possible to reduce the number of rendezvous based on anti dependence relations or output dependence relations. In the first to third methods described above, each of the copy areas created for the similar variable may be discriminated from each other by different names assigned thereto.

How to handle dependence relations between variables differs depending on which one of the first through third methods is used. In the case of the first and third methods, anti dependence relations and output dependence relations between variables are extracted, and, then, the anti dependence relations and output dependence relations that are resolved by creating variable copy areas on a processor-specific basis are discriminated from the anti dependence relations and output dependence relations that are not resolved by creating variable copy areas on a processor-specific basis. Measures are taken with respect to those relations that are not resolved. Further measures are taken with respect to flow dependence relations and def-order relations. In the case of the second method, anti dependence relations and output dependence relations will be resolved by creating variable copy areas on a procedure-specific basis. Measures are thus taken only with respect to flow dependence relations and def-order relations, for example.

The anti dependence relation refers to the case in which a first instruction uses a value of a certain variable, and a second instruction may thereafter define this variable. In this case, an anti dependence relation from the first instruction to the second instruction exists. The output dependence relation refers to the case in which a first instruction defines a value of a certain variable, and a second instruction may thereafter define this variable. In this case, an output dependence relation from the first instruction to the second instruction exists. In either relation, it is not allowed to reverse the execution order such that the first instruction is executed after the second instruction is executed.

With respect to vertices v and w that have an anti dependence relation or an output dependence relation, a proper rendezvous may need to be made with respect to the data transfer of a relevant variable. Details of such a measure will be described later.

In the following, an embodiment will be described. First through third embodiments correspond to the first through third methods described above, respectively. Fourth through sixth embodiments correspond to the first through third embodiments, respectively, with a modification to increase the speed of data transfer with respect to def-order relations. In the following, a description will be given of the first through sixth embodiments in this order.

Figure 6:
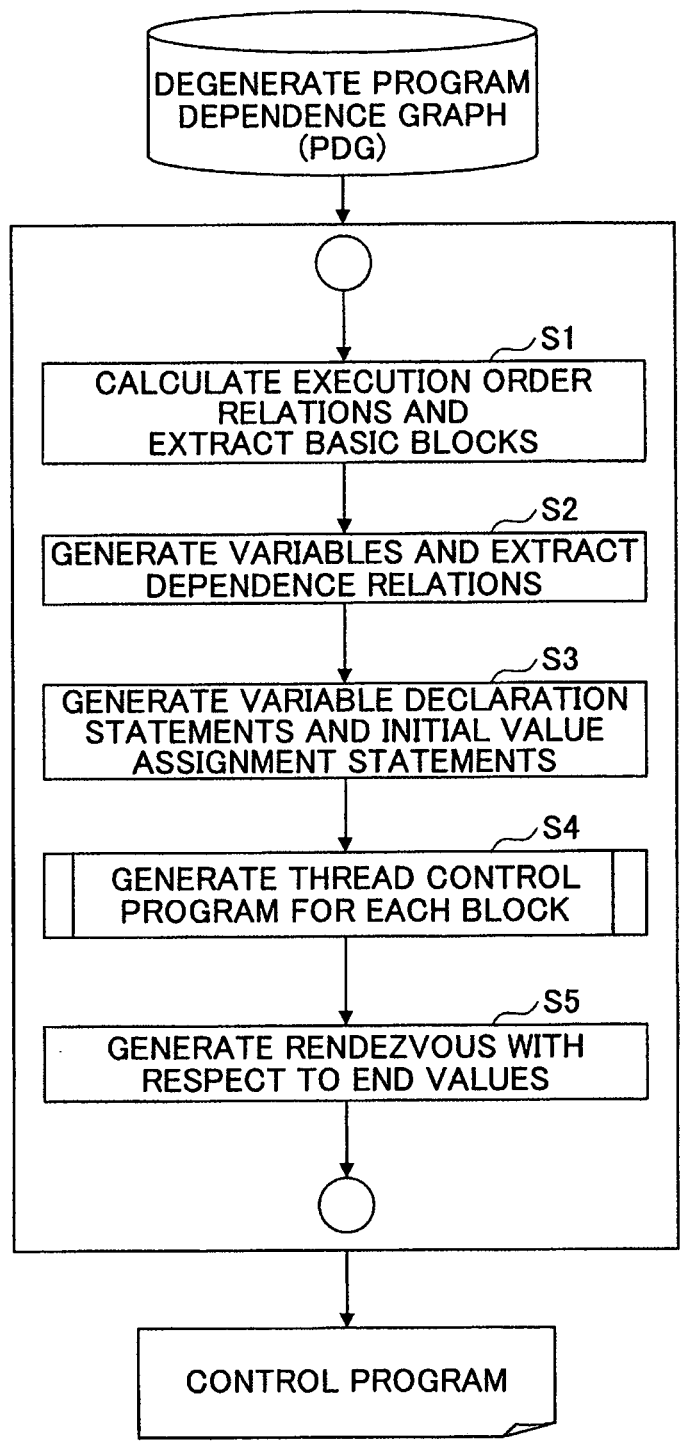
FIG. 6 is a flowchart illustrating a method of generating a procedure control program according to a first embodiment.

FIG. 6 is a flowchart illustrating the method of generating a procedure control program according to the first embodiment. In step 1, execution order relations between vertices are calculated, followed by extracting basic blocks based on the obtained execution orders (i.e., control flows). A degenerate program dependence graph represents only data dependence relations and control dependence relations, for example, and does not explicitly indicate execution orders between vertices. Provision is thus purposefully made to reconstruct proper control flows from the graph. To this end, the execution orders of intermediate nodes are calculated with respect to a control dependence sub-tree of the degenerated program dependence graph. Partial order relations between vertices are obtained as a result. A control program will then be generated by use of the execution order relations. In so doing, anti dependence relations and output dependence relations are extracted. Further, basic blocks are extracted from the obtained execution orders (i.e., control flows).

In step S2, variable generation and dependence relation extraction are performed. In this embodiment, variables are generated on a processor-specific basis, and dependence relations are extracted with respect to these variables.

In step S3, control program variables and initial value assignment statements are generated. As for variables, variables for use in data transfer are generated.

In step S4, a search is conducted with respect to a control dependence subgraph in the similar sequence as the execution orders obtained in step S1 thereby to generate a control program. A control structure represented by a vertex is generated with respect to a predicate vertex. Then, a control program corresponding to a sub-tree subordinate to the vertex is generated as body statements of the control structure. Statements for performing dependence-relation-based asynchronous remote procedure calls and data transfers are generated with respect to the basic blocks. Details of this process will be described later.

In step S5, statements for making a rendezvous with (i.e., performing a wait for) the results of procedure execution are generated.

Figure 7:
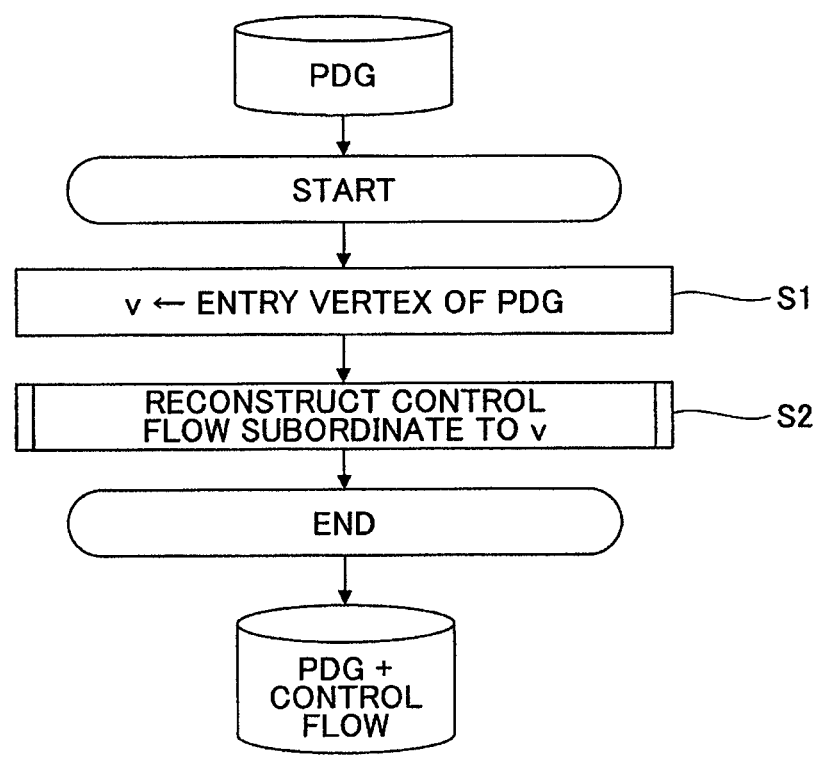
FIG. 7 is a flowchart illustrating a method of determining execution order relations between vertices.

FIG. 7 is a flowchart illustrating the method of determining execution order relations between vertices. The process illustrated in FIG. 7 corresponds to the first half of step S1 in FIG. 6. Data input into the process of FIG. 7 is a degenerate program dependence graph PDG, and data output therefrom is the degenerate program dependence graph PDG and its control flows.

In step S1, an entry vertex of the degenerate program dependence graph PDG (i.e., start point of the program) is denoted as v. In step S2, a control flow subordinate to vertex v is reconstructed. With this, the procedure comes to an end.

Figure 8:
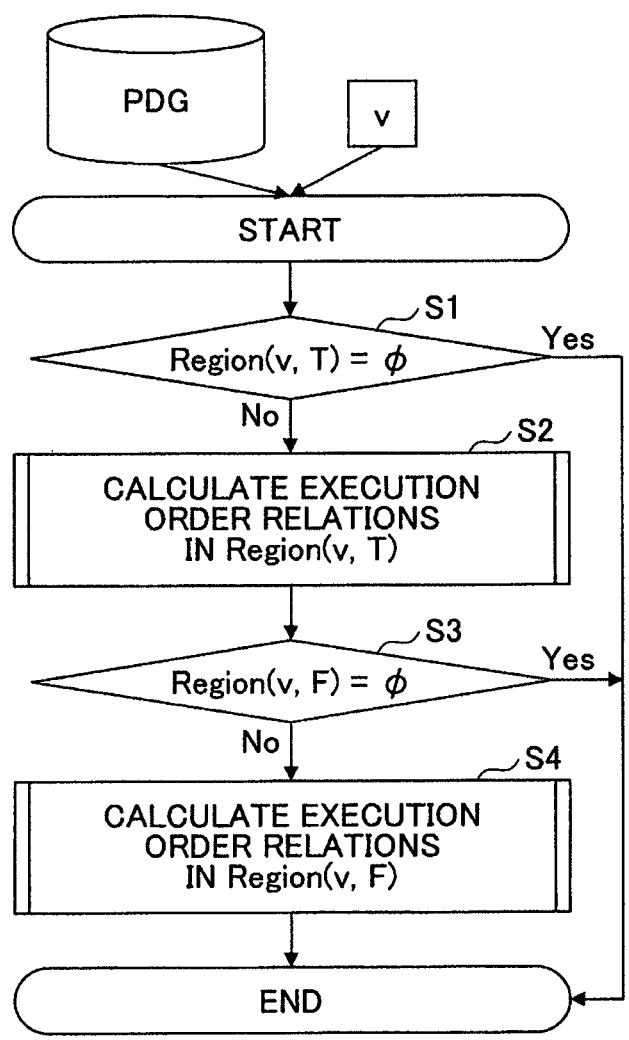
FIG. 8 is a flowchart illustrating the process of reconstructing a control flow subordinate to vertex v.

FIG. 8 is a flowchart illustrating the process of reconstructing a control flow subordinate to vertex v (i.e., step S2 of FIG. 7). Data input into the process of FIG. 8 is the degenerate program dependence graph PDG and the vertex v.

In step S1, a check is made as to whether Region(v, T)={u|u ∈ V, v→$_c^T$u ∈ E} is an empty set. If it is an empty set, the procedure comes to an end. Otherwise, the procedure proceeds to step S2. Here, Region(v, T) is a set of vertices u where a control dependence relation L=F from vertex v to vertex u is in existence. V is a vertex set, and E is an edge set. v→$_c^T$u indicates an L=F control dependence edge.

In step S2, execution order relations in Region(v, T) are calculated. In step S3, a check is made as to whether Region (v, F)={u↑u ∈ V, v→$_c^F$u ∈ E} is an empty set. If it is an empty set, the procedure comes to an end. Otherwise, the procedure proceeds to step S4. Here, Region(v, F) is a set of vertices u where a control dependence relation L=F from vertex v to vertex u is in existence. With this, the procedure comes to an end.

Figure 9:
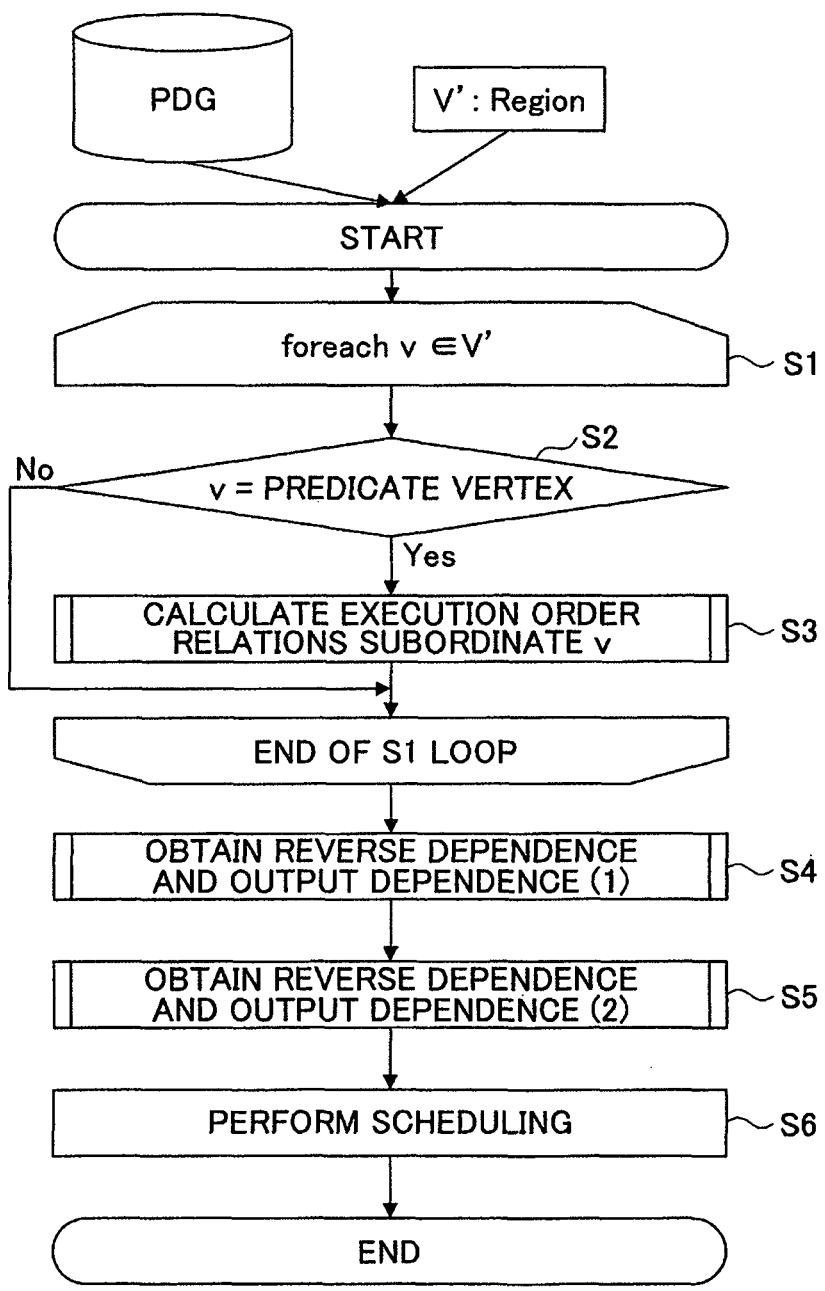
FIG. 9 is a flowchart illustrating a method of calculating execution order relations in Region.

FIG. 9 is a flowchart illustrating the method of calculating execution order relations in Region. This process corresponds to each of step S2 and step S4 illustrated in FIG. 8. Data input into the process of FIG. 9 is the degenerate program dependence graph PDG and V' (Region of interest).

In step S1, a loop to repeat the processes of steps S2 and S3 with respect to each vertex v of the region of interest V' is started. In step S2, a check is made as to whether v is a predicate vertex (i.e., a vertex representing a condition check in "If-then-else" or "while-loop"). Only if v is a predicate vertex, is step S3 performed, for example. In step S3, execution order relations subordinate to vertex v are calculated.

In step S4, anti dependence relations and output dependence relations are obtained. Here, data dependence relations (anti dependence and output dependence) attributable to control flows are extracted. Specifically, anti dependence and output dependence in the region of interest are expressed based on data dependence relations crossing the border of the region of interest (i.e., Region).

In step S5, anti dependence and output dependence are obtained. Here, execution orders inside the region of interest (i.e., Region) are determined. Namely, proper execution order restrictions are determined with respect to a set of vertices in Region for which execution orders are not uniquely determined. Specifically, anti dependence relations and output dependence relations in Region are revealed based on the execution order restrictions imposed by the obtained anti dependence relations and output dependence relations, thereby determining execution orders. When execution orders are arbitrary, anti dependence relations and output dependence relations are repeatedly obtained based on assumed execution orders until non-contradicting execution orders are obtained.

In step S6, scheduling is performed. Namely, the execution orders of vertices are determined based on the execution order relations obtained above. This problem is equivalent to a general scheduling problem regarding a graph for which partial-order relations are satisfied. Accordingly, it is feasible to use well-known scheduling methods such as the topological sort or the list scheduling using an approximate estimate of vertex execution time as a weight. In so doing, each vertex is also allocated to a corresponding PE (i.e., processor element).

Figure 10:
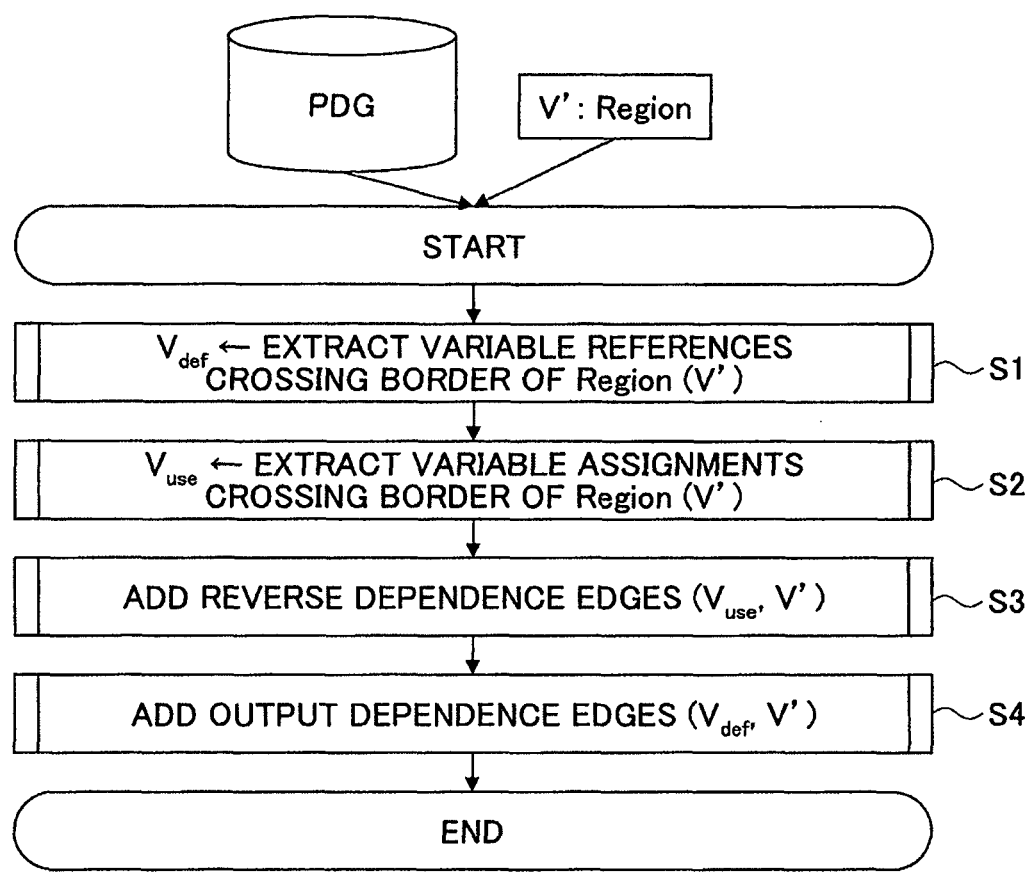
FIG. 10 is a flowchart illustrating the process of obtaining anti dependence and output dependence.

FIG. 10 is a flowchart illustrating the process of obtaining anti dependence and output dependence (i.e., step S4 of FIG. 9). Data input into the process of FIG. 10 is the degenerate program dependence graph PDG and V' (Region of interest).

In step S1, a variable reference crossing the border of the region of interest V' is extracted and denoted as $V_{def}$. In step S2, a variable assignment crossing the border of the region of interest V' is extracted and denoted as $V_{use}$. In step S3, an anti dependent edge is added based on $V_{use}$ and V'. In step S4, an output dependent edge is added based on $V_{def}$ and V'. With this, the procedure comes to an end.

Figure 11:
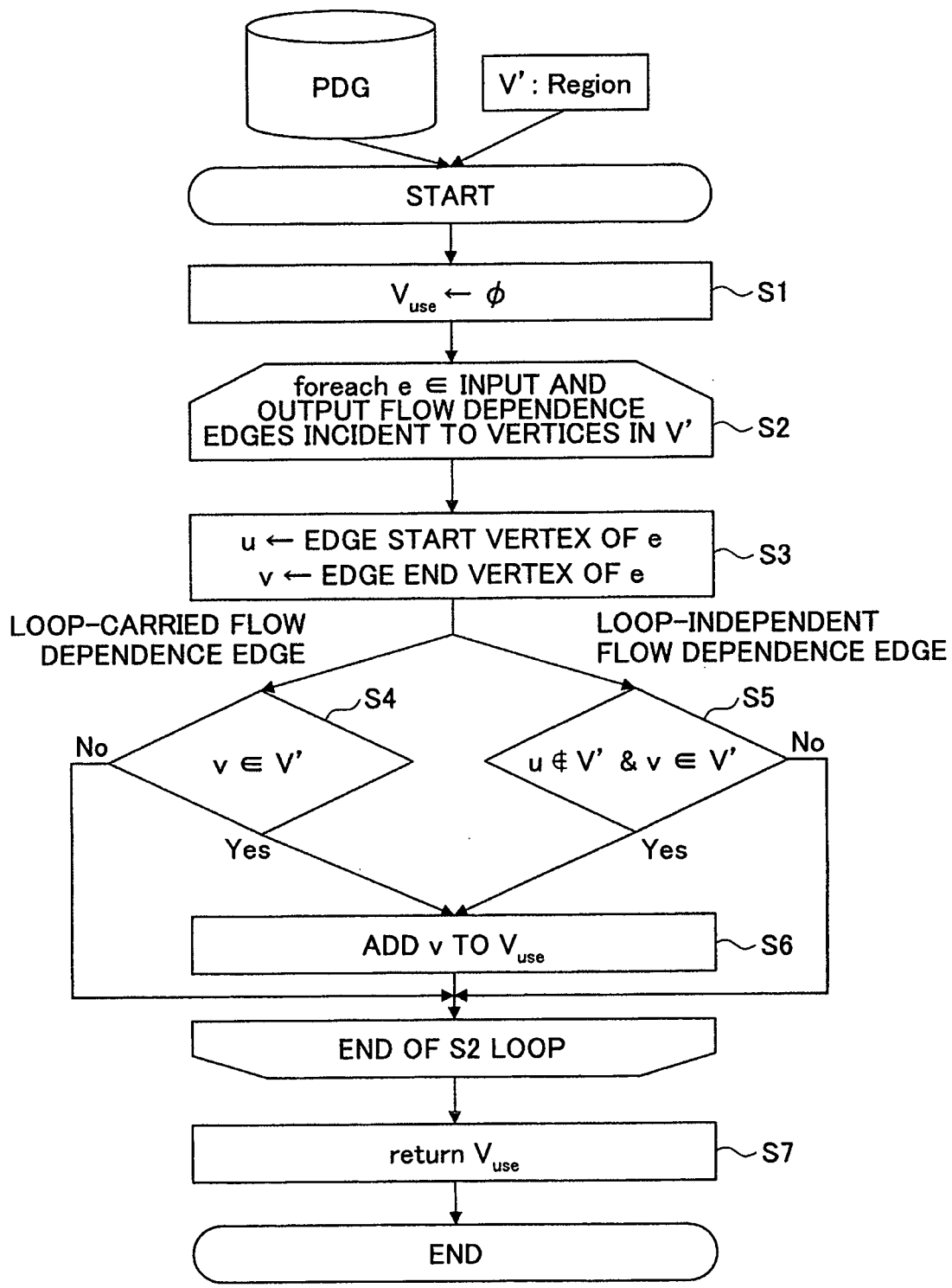
FIG. 11 is a flowchart illustrating the process of extracting a variable reference crossing the border of a region of interest.

FIG. 11 is a flowchart illustrating the process of extracting a variable reference crossing the border of a region of interest. The process of FIG. 11 corresponds to step S1 of FIG. 10, and receives as input data the degenerate program dependence graph PDG and V' (Region of interest).

In step S1, a set $V_{use}$ of vertices is emptied. In step S2, a loop to repeat the following processes with respect to each flow dependence edge in the region of interest V' is started. Here, the flow dependence edge includes a loop-independent flow dependence edge and a loop-carried flow dependence edge. In step S3, a vertex from which flow dependence edge e emanates is denoted as u, and a vertex to which the edge e is incident is denoted as v.

In the case of a loop-carried flow dependence edge, a check is made in step S4 as to whether the condition that the edge end vertex v is included in the region of interest V' is satisfied. In the case of a loop-independent flow dependence edge, a check is made in step S5 as to whether the conditions that the edge start vertex u is not included in the region of interest V' and the edge end vertex v is included in the region of interest V' are satisfied. Only if the answer to the check is yes, for example, is step S6 performed. In step S6, the edge end vertex v is added to the vertex set $V_{use}$.

Lastly, in step S7, the vertex set $V_{use}$ is returned as a value. With this, the procedure comes to an end.

Figure 12:
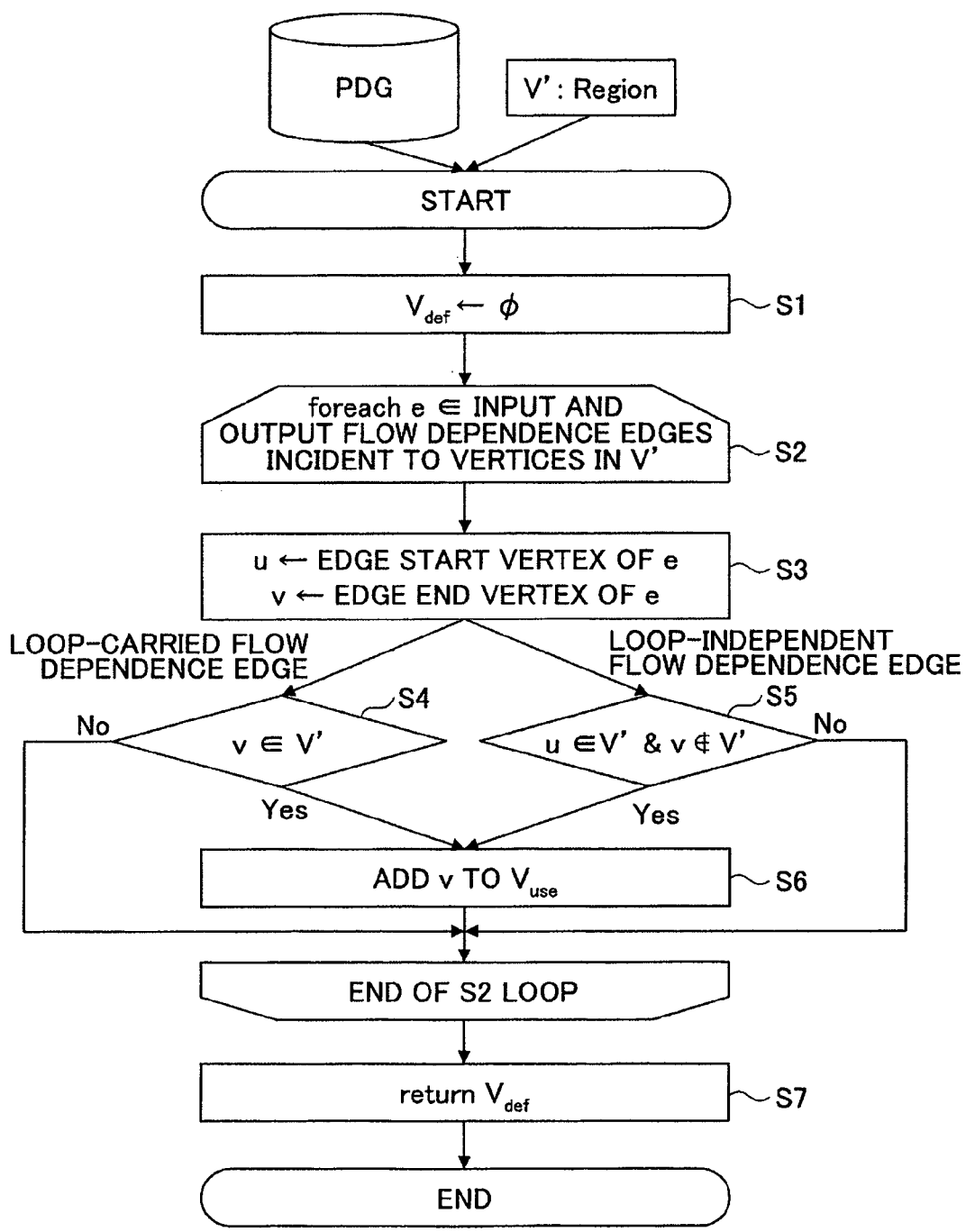
FIG. 12 is a flowchart illustrating the process of extracting a variable assignment crossing the border of a region of interest.

FIG. 12 is a flowchart illustrating the process of extracting a variable assignment crossing the border of a region of interest. The process of FIG. 12 corresponds to step S2 of FIG. 10, and receives as input data the degenerate program dependence graph PDG and V' (Region of interest).

In step S1, a set $V_{def}$ of vertices is emptied. In step S2, a loop to repeat the following processes with respect to each flow dependence edge in the region of interest V' is started. Here, the flow dependence edge includes a loop-independent flow dependence edge and a loop-carried flow dependence edge. In step S3, a vertex from which flow dependence edge e emanates is denoted as u, and a vertex to which the edge e is incident is denoted as v.

In the case of a loop-carried flow dependence edge, a check is made in step S4 as to whether the condition that the edge end vertex v is included in the region of interest V' is satisfied. In the case of a loop-independent flow dependence edge, a check is made in step S5 as to whether the conditions that the edge start vertex u is included in the region of interest V' and the edge end vertex v is not included in the region of interest V' are satisfied. Only if an answer to either check is yes, is step S6 performed, for example. In step S6, the edge end vertex v is added to the vertex set $V_{def}$.

Lastly, in step S7, the vertex set $V_{def}$ is returned as a value. With this, the procedure comes to an end.

Figure 13:
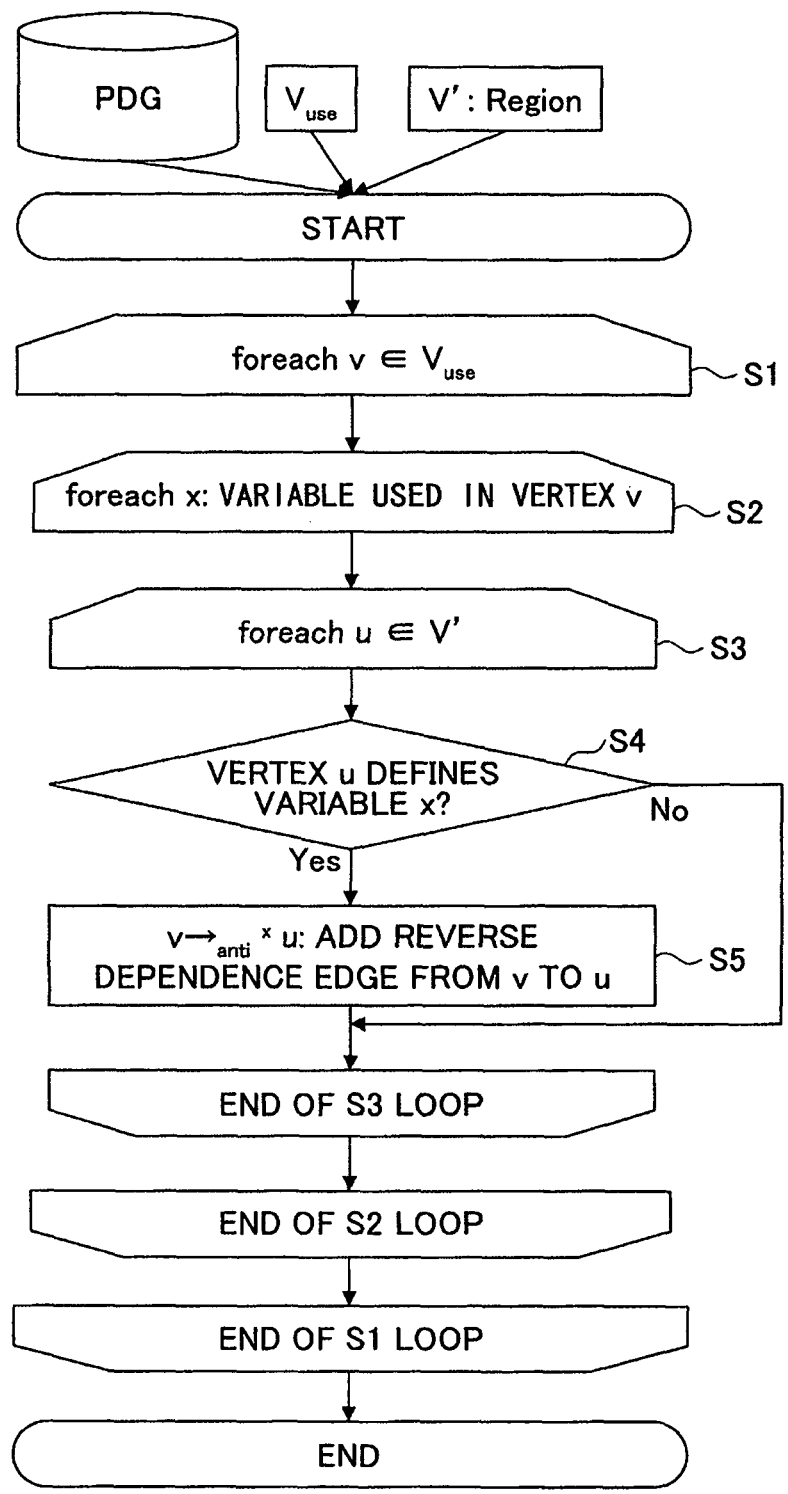
FIG. 13 is a flowchart illustrating the process of adding anti dependence.

FIG. 13 is a flowchart illustrating the process of adding anti dependence. The process of FIG. 13 corresponds to step S3 of FIG. 10, and receives as input data the degenerate program dependence graph PDG, V' (Region of interest), and the vertex set $V_{use}$.

In step S1, a loop to repeat the following processes with respect to each vertex v in the vertex set $V_{use}$ is started. In step S2, a loop to repeat the following processes with respect to each variable x used in vertex v is started. In step S3, a loop to repeat the following processes with respect to each vertex u in the region of interest V' is started.

In step S4, a check is made as to whether vertex u defines variable x. Only if the answer to the check is yes, for example, is step S5 performed. In step S5, an anti dependence edge from v to u is added. With this, the procedure comes to an end.

Figure 14:
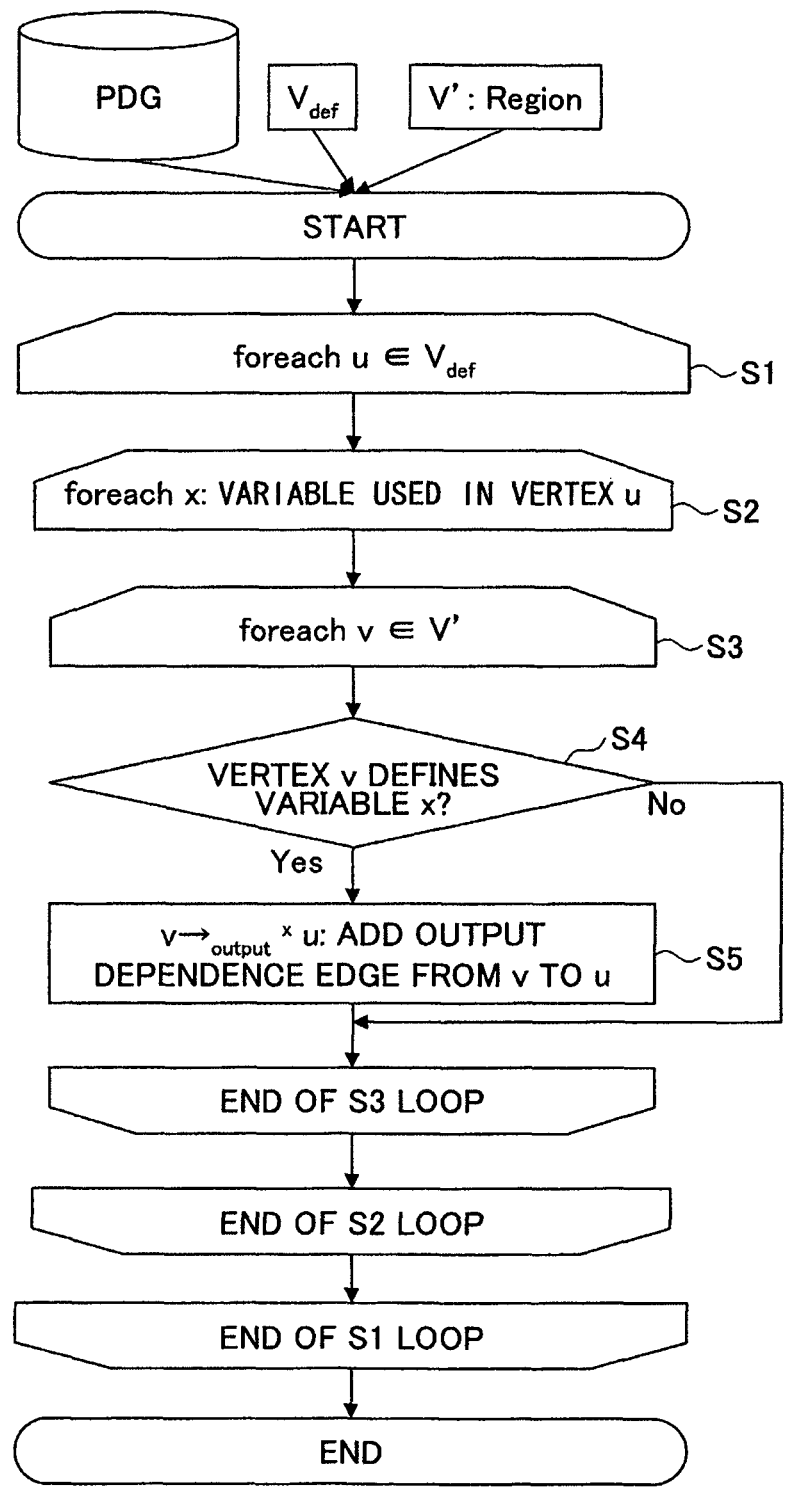
FIG. 14 is a flowchart illustrating the process of adding output dependence.

FIG. 14 is a flowchart illustrating the process of adding output dependence. The process of FIG. 14 corresponds to step S4 of FIG. 10, and receives as input data the degenerate program dependence graph PDG, V' (Region of interest), and the vertex set $V_{def}$.

In step S1, a loop to repeat the following processes with respect to each vertex u in the vertex set $V_{def}$ is started. In step S2, a loop to repeat the following processes with respect to each variable x used in vertex u is started. In step S3, a loop to repeat the following processes with respect to each vertex v in the region of interest V' is started.

In step S4, a check is made as to whether vertex v defines variable x. Only if the answer to the check is yes, for example, is step S5 performed. In step S5, an output dependence edge from v to u is added. With this, the procedure comes to an end.

Figure 15:
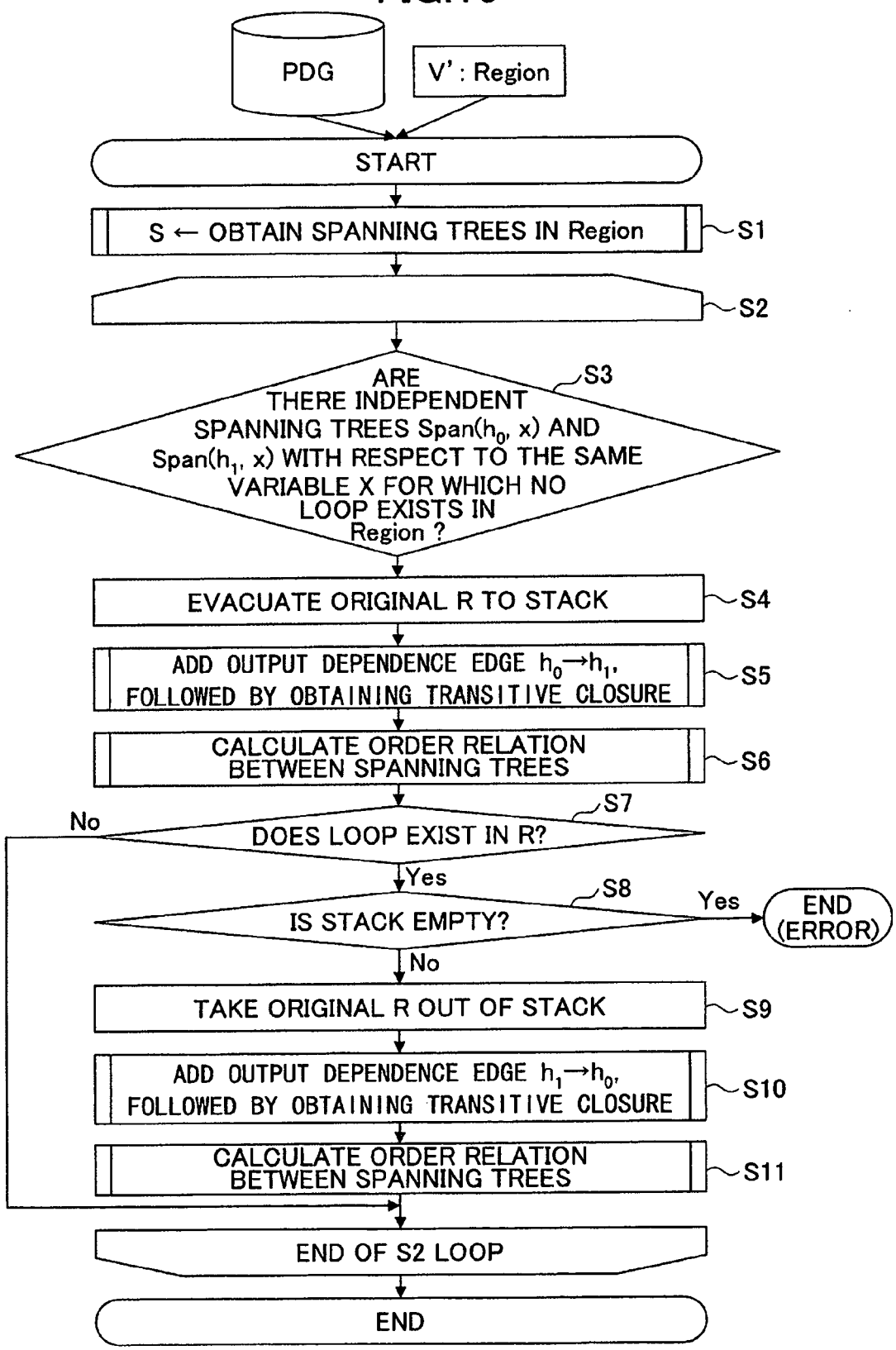
FIG. 15 is a flowchart illustrating the process of obtaining anti dependence and output dependence.

FIG. 15 is a flowchart illustrating the process of obtaining anti dependence and output dependence (i.e., step S5 of FIG. 9). Data input into the process of FIG. 15 is the degenerate program dependence graph PDG and V' (Region of interest).

In step S1, a spanning tree S is obtained with respect to the region of interest. A spanning tree regarding variable x of vertex v shown in the following is defined as a set of vertices that include vertex v defining variable x and vertices using the variable x in Region R.

$$\mathrm{Span}(v, x) = \{v\} \cup \{u | v \to_{li}^{x} u \in E_R\}$$

Figure 16:
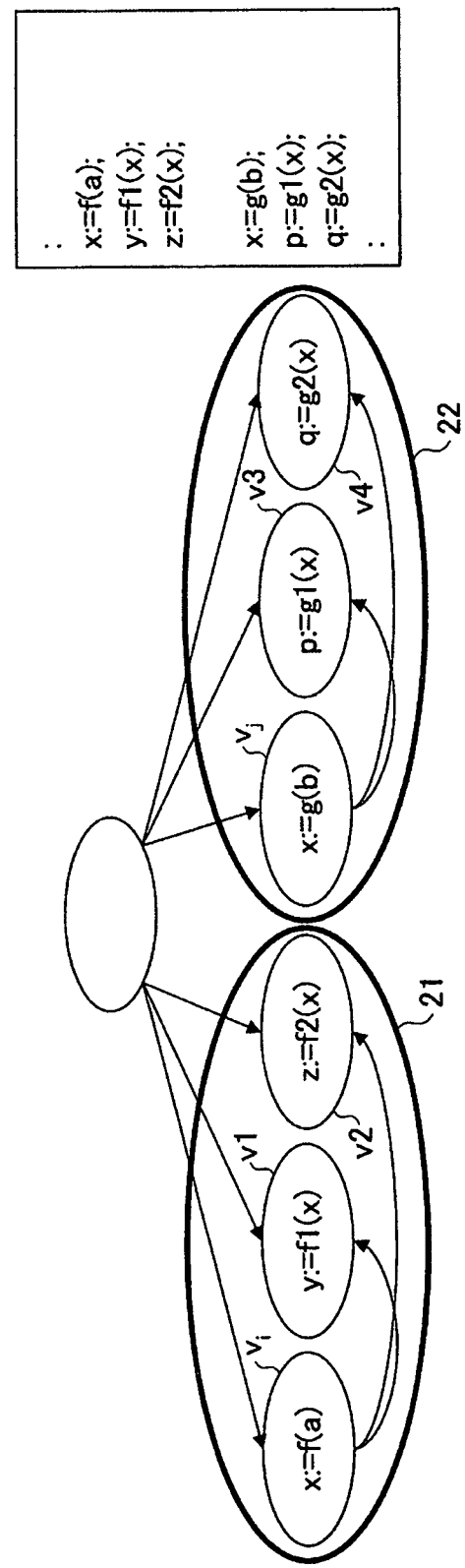
FIG. 16 is a drawing for illustrating a spanning tree.
Figure 17:
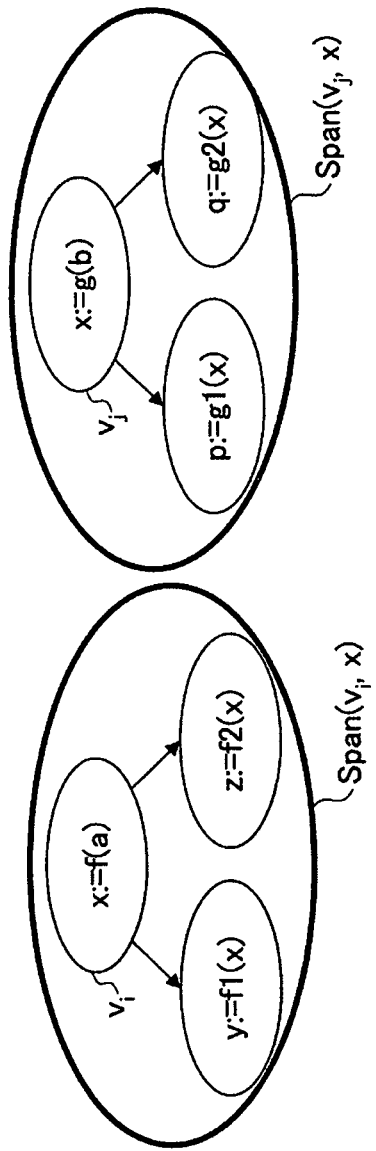
FIG. 17 is a drawing schematically illustrating a spanning tree.

FIG. 16 is a drawing for illustrating a spanning tree. In the program dependence graph illustrated in FIG. 16, variable x is defined at vertex $v_i$, and two vertices v1 and v2 use the variable x. In this case, vertices $v_i$, v1, and v2 constitute a spanning tree 21. Further, variable x is defined at vertex $v_j$, and two vertices v3 and v4 use the variable x. In this case, vertices $v_j$, v3, and v4 constitute a spanning tree 22. FIG. 17 is a drawing schematically illustrating a spanning tree A spanning tree Span($v_i$, x) and a spanning tree Span($v_j$, x) are configured as a data dependency graph as illustrated in FIG. 17.

Referring to FIG. 15 again, in step S2, a loop is started to repeat the following processes with respect to a successively selected pair of two spanning trees for which an execution order is undetermined. In step S3, a check is made as to whether there are independent spanning trees Span($h_0$, x) and Span($h_1$, x) with respect to the similar variable x for which no loop exists in a region of interest. Here, the term "independent" means that no edge (i.e., dependent relation) exists between a vertex included in the spanning tree Span($h_0$, x) and a vertex included in the spanning tree Span($h_1$, x).

In step S4, the original of R (i.e., Region) is evacuated to a stack. In step S5, an output dependence edge $h_0 \rightarrow h_1$ is added, and a transitive closure is obtained. In step S6, an order relation between the spanning trees is calculated.

In step S7, a check is made as to whether a loop exists in R (Region). If no loop exists, the processes of step S8 through step S11 will be skipped. If a loop exists, the procedure goes to step S8. In step S8, a check is made as to whether the stack is empty. If it is empty, the procedure comes to an end with an indication of error. If it is not empty, the original of R is taken out of the stack in step S9.

The processes described above correspond to the operation in which, upon adding an output dependence relation from vertex $h_0$ to vertex $h_1$ to the graph, the added dependence relation is fixed if the graph has not turned into a cyclic graph, and the original graph is restored if the graph has turned into a cyclic graph. After restoring the original graph, an output dependence relation from vertex $h_1$ to vertex $h_0$ is added to the graph. Namely, an output dependence edge $h_1 \rightarrow h_0$ is added in step S10, and a transitive closure is obtained. In step S11, an order relation between the spanning trees is calculated.

Through the procedure described above, an execution order is determined with respect to two spanning trees Span($h_0$, x) and Span($h_1$, x). Further, any two spanning trees for which an execution order is undetermined are successively selected and subjected to the similar procedure as described above, which comes to an end when execution orders are determined with respect to all the spanning trees.

Figure 18:
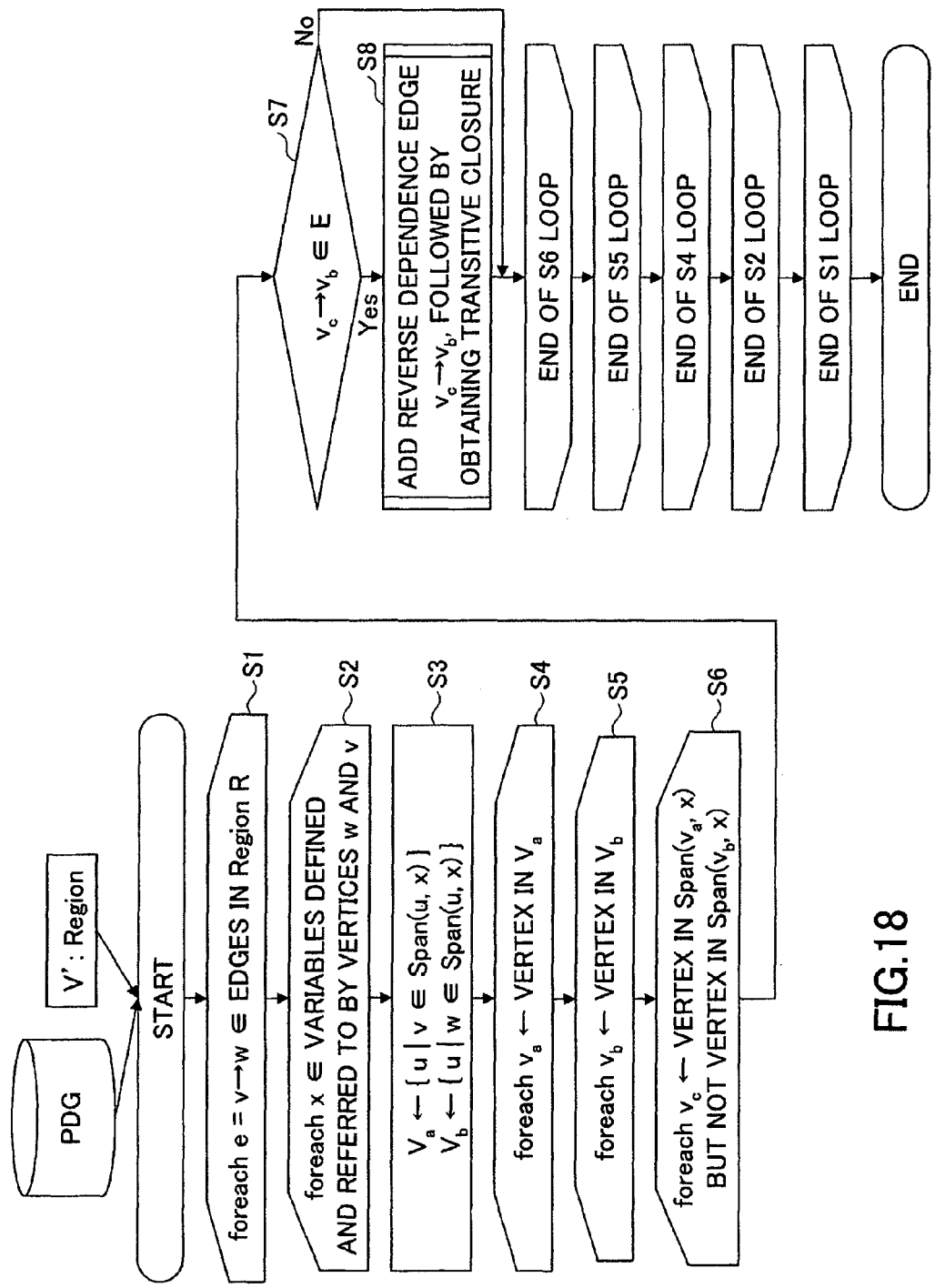
FIG. 18 is a flowchart illustrating the process of calculating order relations between spanning trees.

FIG. 18 is a flowchart illustrating the process of calculating order relations between spanning trees. The process illustrated in FIG. 18 corresponds to step S6 and step S11 of FIG. 15. Data input into the process of FIG. 18 is the degenerate program dependence graph PDG and V' (Region of interest).

In step S1, a loop to repeat the following processes with respect to each edge e (vertex v→vertex w) in the region of interest is started. In step S2, a loop to repeat the following processes with respect to each variable x defined at vertex w and referred to at vertex v is started.

In step S3, $V_a \leftarrow \{u|v \in \text{Span}(u, x)\}$ and $V_b \leftarrow \{u|w \in \text{Span}(u, x)\}$ are performed. Namely, a set of vertices that define variable x is obtained in the spanning tree regarding variable x that includes vertex v as an element, and, further, a set of vertices that define variable x is obtained in the spanning tree regarding variable x that includes vertex w as an element.

In step S4, a loop to repeat the following processes with respect to each vertex $v_a$ in $V_a$ is started. In step S5, a loop to repeat the following processes with respect to each vertex $v_b$ in $V_b$ is started. In step S6, a loop to repeat the following processes with respect to each vertex $v_c$ that is a vertex in Span($v_a$, x) but not a vertex in Span($v_b$, x) is started.

In step S7, a check is made as to whether vc→vb is included in E (i.e., edge set). Only if the answer to the check is yes, is step S8 performed, for example. In step S8, an anti dependence edge vc→vb is added, and a transitive closure is obtained. Thereafter, the processes are repeated for each loop.

Figure 19:
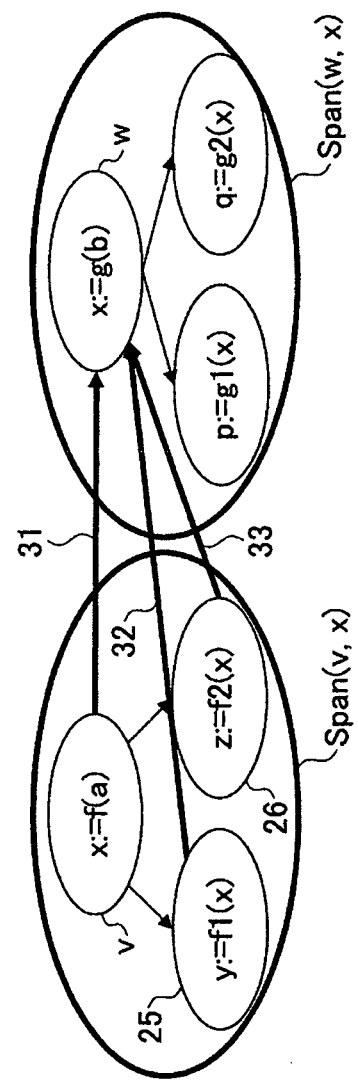
FIG. 19 is a drawing for illustrating the addition of a anti dependence edge performed in FIG. 18.

FIG. 19 is a drawing for illustrating the addition of an anti dependence edge performed in FIG. 18. FIG. 19 illustrates spanning tree Span(v, x) regarding variable x of vertex v and spanning tree Span(w, x) regarding variable x of vertex w. Anti dependence edges 32 and 33 incident to head vb (i.e., vertex w defining variable x) are added with respect to each vertex $v_c$ (i.e., v, 25, and 26) of spanning tree Span($v_a$, x) (i.e., Span(v, x)) regarding variable x and including vertex v.

Figure 20:
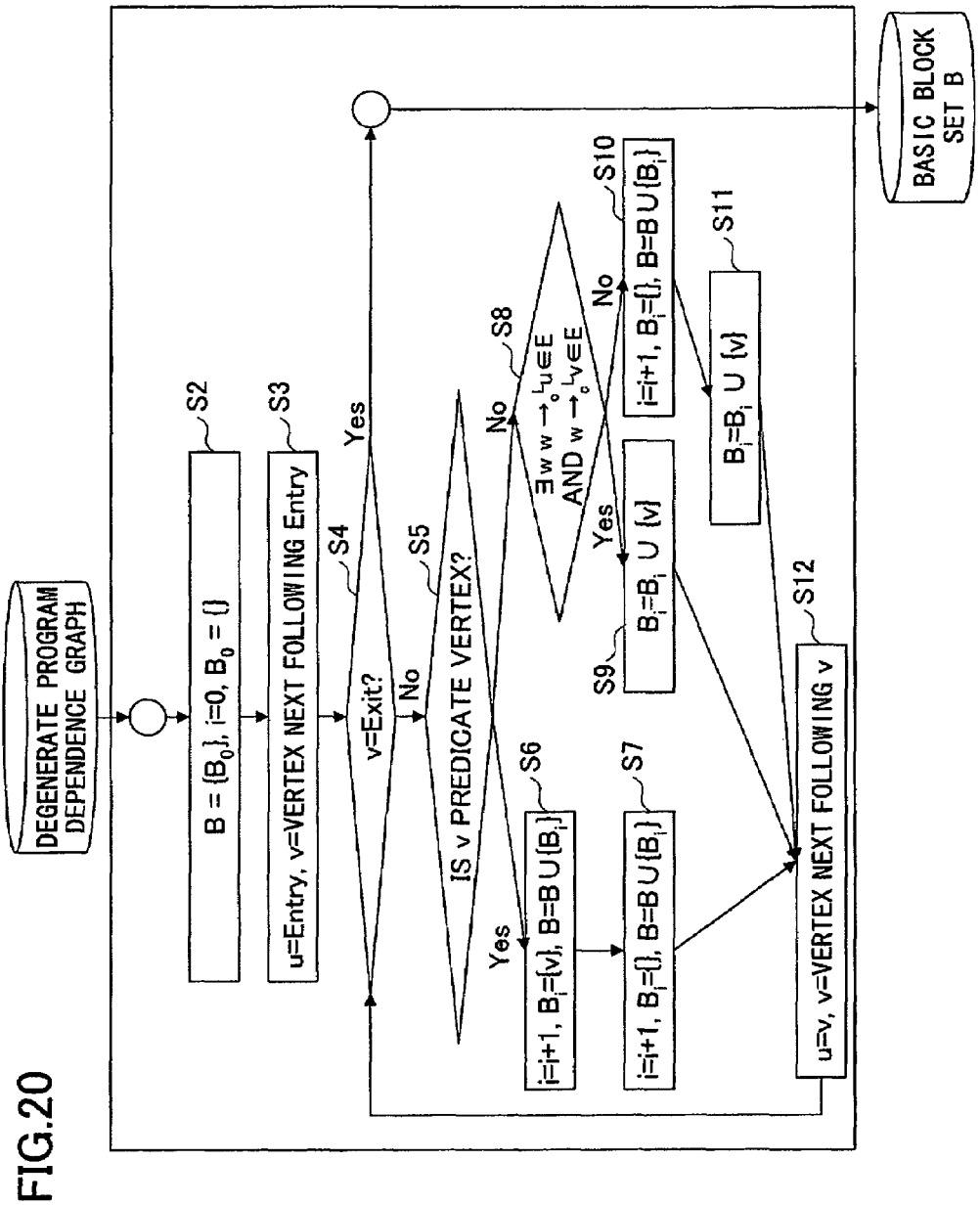
FIG. 20 is a flowchart illustrating the process of extracting basic blocks.

FIG. 20 is a flowchart illustrating the process of extracting basic blocks. The process illustrated in FIG. 20 corresponds to the second half of step S1 in FIG. 6. Data input into the process of FIG. 20 is the degenerate program dependence graph PDG for which execution order relations have been determined.

Vertices are selected one after another in the similar sequence as the obtained control flow, followed by performing a process responsive to the type of each selected vertex. In the following description, B denotes a set of basic blocks, and $B_i$ denotes the i-th basic block. Further, v is a current vertex (i.e., vertex of interest), and u is a vertex immediately preceding the current vertex.

In step S2, the first basic block B0 is generated as an empty set. In step S3, an entry vertex (i.e., start point of the program) is denoted as u, and the vertex next following the entry vertex is denoted as v. In step S4, a check is made as to whether current vertex v is the last vertex. If it is the last vertex, the procedure comes to an end, with the basic block set B obtained as an outcome.

If current vertex v is not the last vertex, the procedure proceeds to step S5, in which a check is made as to whether current vertex v is a predicate vertex (i.e., a vertex representing a condition check in "If-then-else" or "while-loop"). In the case of a predicate vertex, the procedure proceeds to step S6 in which i is incremented by one, and v is used as an element of $B_i$ thereby to create a new basic block $B_i$ including only a predicate, for example. In step S7, i is further incremented by one thereby to create a new basic block $B_i$ that is an empty set.

If current vertex v is not a predicate vertex (i.e., No in step S5), the procedure proceeds to step S8, in which a check is made as to whether current vertex v and preceding vertex u have a control dependence relation from the similar predicate vertex and such a control dependence relation is based on the similar condition check flag. An answer to this check is No when one of u and v is situated inside an IF statement and the other situated outside the IF statement, or one of them corresponds to the THEN clause of an IF statement and the other to the ELSE clause, for example. Namely, step S8 checks whether both of these two vertices are performed upon the similar conditions being satisfied.

If the answer to the check in step S8 is Yes, the procedure proceeds to step S9, in which current vertex v is added to the current basic block. If the answer to the check in step S8 is No, i is incremented by one in step S10 thereby to create a new basic block $B_i$ that is an empty set. In step S11, current vertex v is added to the newly created basic block $B_i$. In step S12, u and v are updated to represent a next pair of vertices, and the procedure proceeds to step S4 to repeat the subsequent processes.

Through the procedure described above, each basic block $B_i$ is generated that is a series of vertices sequentially executed without including branches (i.e., IF, GOTO, LOOP, and so on) and merging, with the basic block set B comprised of the generated basic blocks being obtained as an outcome. A series of vertices inclusive of no branches and merging is the similar to a series of vertices that are sequentially executed in a fixed execution order. As can be understood from the flowchart of FIG. 20, each predicate vertex by itself constitutes a basic block $B_i$. A basic block $B_i$ that is not a predicate vertex includes a series of vertices that are sequentially executed in a fixed execution order without having an intervening branch or merging.

In the technology disclosed herein, dependence relations between procedures across different basic blocks are handled such that a subsequent procedure is executed after waiting for the completion of output data transfer of a preceding procedure. Procedures having dependence relations with each other within the similar basic block are executed by use of asynchronous remote procedure calls with a dependence-relation-based wait. Namely, procedures having a dependence relation crossing the border between basic blocks are controlled such that an instruction to execute the subsequent procedure is placed after an instruction to wait for the output data transfer of the preceding procedure, thereby satisfying the dependence relation. Further, procedures having a dependence relation within the similar basic block are controlled such that an instruction is generated to explicitly register the subsequent procedure's dependence on the output data transfer of the preceding procedure, thereby satisfying the dependence relation. With such a configuration, the generation of control programs is made easier by implementing procedure execution based on a wait mechanism with respect to complex control dependence relations between basic blocks, and, also, a needless waiting time is eliminated by use of an asynchronous remote procedure call with a dependence-relation-based wait within the same basic block in which execution sequence is fixed.

Through the procedure described above, basic blocks are extracted. Namely, the second half of step S1 of FIG. 6 has been performed.

Figure 21:
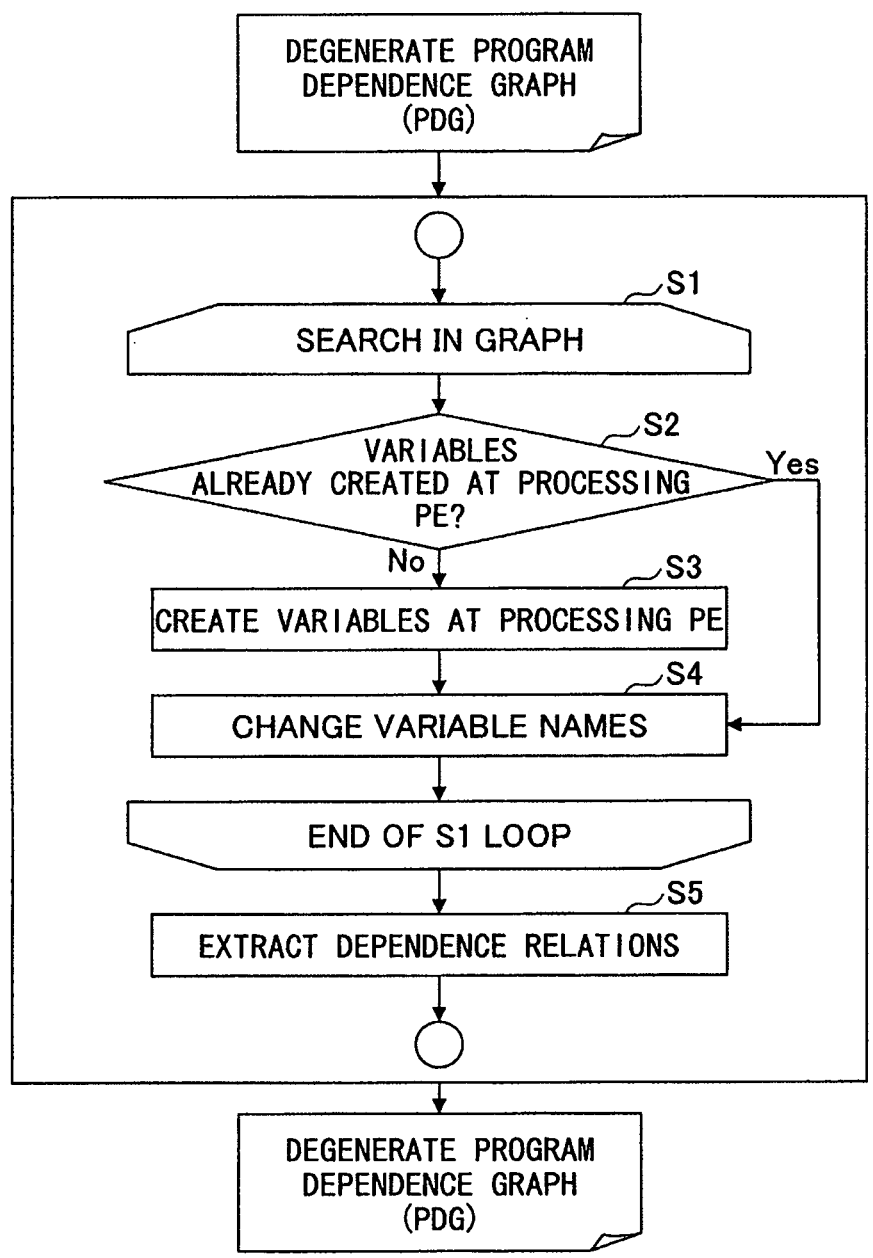
FIG. 21 is a flowchart illustrating the process of generating variables on a processor-specific basis and the process of extracting dependence relations.

FIG. 21 is a flowchart illustrating the process of generating variables on a processor-specific basis and the process of extracting dependence relations. The process illustrated in FIG. 21 corresponds to the process of step S2 in FIG. 6.

In step S1, a loop to repeat the following processes with respect to each vertex in the degenerate program dependence graph is started.

In step S2, a check is made as to whether variables have already been created for a processor that is to perform a procedure of a vertex if the vertex of interest is a program block vertex. If variables have already been created for the executing processor, the procedure proceeds to step S4. If variables have not already been created for the executing processor, variables are created in step S3, and, then, the procedure proceeds to step S4.

In step S4, variable names are changed. If variable x has been created for processor PE1, for example, its name is changed to a variable name (e.g., PE1_x) indicating that this variable x belongs to the processor PE1.

The processes are described above are performed with respect to each vertex in the degenerate program dependence graph. Thereafter, anti dependence relations and output dependence relations are extracted in step S5. It may be noted that anti dependence relations and output dependence relations have already been obtained in step S1 of FIG. 6. In this step S5, anti dependence relations and output dependence relations may be obtained by removing the anti dependence relations and output dependence relations for which dependence relations have been resolved by the variable name changes as described above.

A anti dependence relation $v \to_{anti}^{x} w$ with respect to variable x is removed when all the following conditions are satisfied.

$PE(v) \neq PE(w)$ $\neg \exists u \in V \; w \to_f^x u \in E$ and $PE(v) = PE(u)$ Here, PE(v) represents a processor PE that executes vertex v. The first condition described above indicates that vertexes v and w having an anti dependence relation are allocated to different processors PE. Variables are different for different processors, so that such an anti dependence relation may possibly be removed in this case. If vertices v and w are allocated to the similar processor PEi, a reserve dependence relation is not resolved with respect to this processor's variable x (e.g., PEi_x) It is thus not allowed to remove this anti dependence relation. Namely, provision is purposefully made to wait for the completion of the process of vertex v before executing vertex w.

The second condition described above takes into account the situation in which a value assigned at vertex w is referred to at vertex u. If vertices v and u are allocated to the similar processor PEi, the value of variable x assigned at vertex w is transferred to variable x of the processor PEi for the purpose of allowing vertex u to refer to this value. Since vertex v also refers to variable x of the processor PEi, provision is purposefully made to cause data transfer from vertex w to wait until the process of vertex v comes to an end.

An output dependence relation $v \to_{output}^{x} w$ with respect to variable x is removed when all the following conditions are satisfied.

$PE(v) \neq PE(w)$ $\neg \exists u \in V \; w \to_f^x u \in E \; PE(v) = PE(u)$

The first condition described above indicates that vertices v and w are allocated to different processors PE. If vertices v and w are allocated to the similar processor PEi, an output dependence relation is not resolved with respect to this processor's variable x. Since a subsequent vertex uses the results of vertex v, provision is purposefully made to wait for the completion of relevant data transfer before executing vertex w.

The second condition described above takes into account the situation in which a value assigned at vertex w is referred to at vertex u. If vertices v and u are allocated to the similar processor PEi, a value assigned at vertex w is transferred to variable x of the processor PEi. Since a subsequent vertex uses the results of vertex v, provision is purposefully made to wait for the completion of relevant data transfer before transferring data from vertex w. If a relation corresponds to a def-order relation, such a relation is treated as a def-order relation, thereby removing the output dependence relation.

Through the procedure described above, variable generation and dependence relation extraction are performed. Namely, the process of step S2 of FIG. 6 has been performed.

Figure 22:
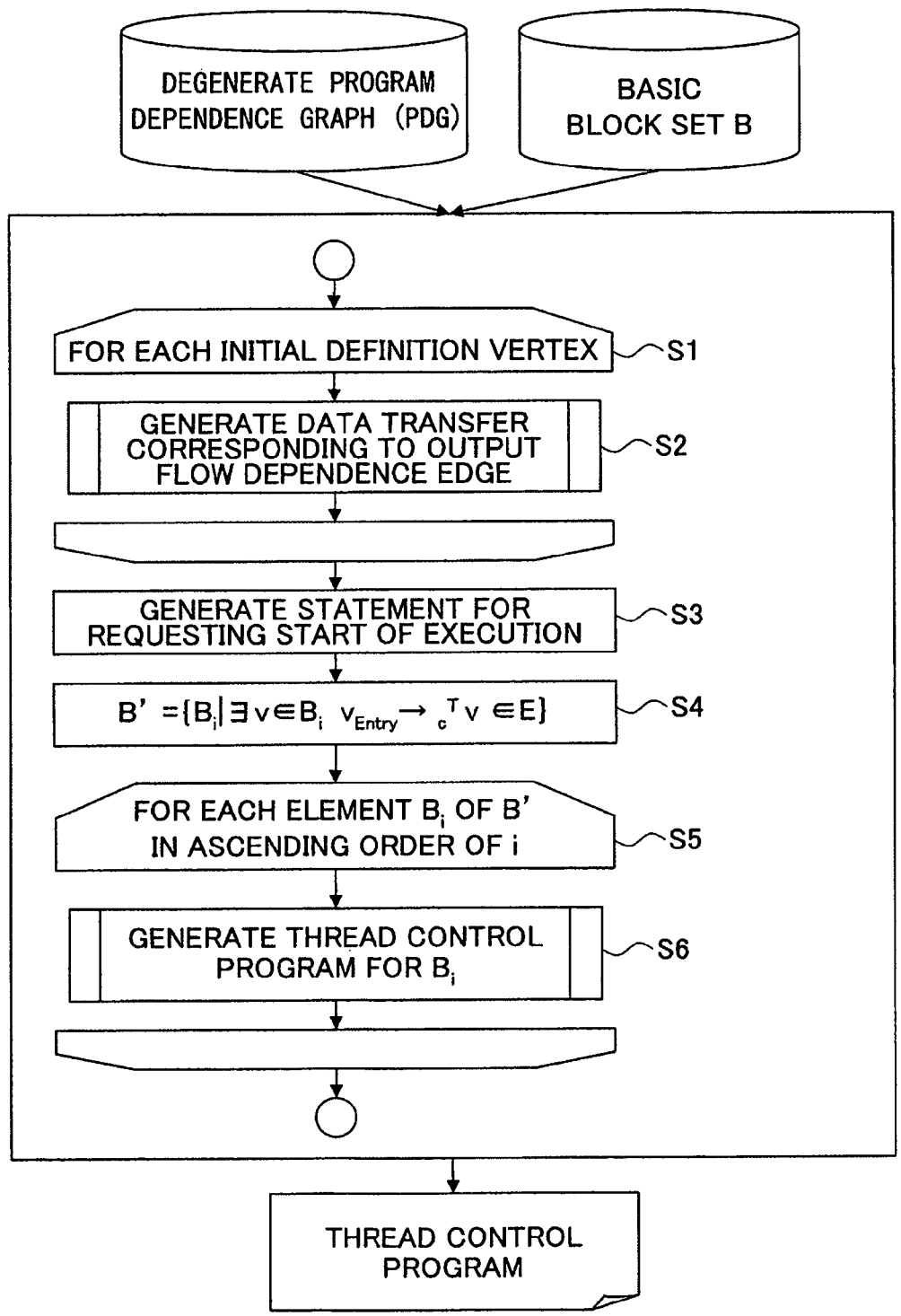
FIG. 22 is a flowchart illustrating the process of generating a control program.

FIG. 22 is a flowchart illustrating the process of generating a control program. The process illustrated in FIG. 22 corresponds to the process of step S4 (and S5) in FIG. 6. Data input into the process of FIG. 22 is the basic block set B and the degenerate program dependence graph PDG for which execution order relations have been determined.

In step S1, a loop to repeat the following processes with respect to each initial definition vertex is started. Here, the term "initial definition vertex" refers to a vertex for which an initial value of a variable is predetermined.

In step S2, data transfer is generated with respect to an output flow dependence edge. Namely, a statement for performing data transfer is generated with respect to a flow dependence edge extending from the initial definition vertex to a program block vertex. This serves to perform initial data transfer.

The process described above is repeatedly performed with respect to each initial definition vertex. Then, a statement to request the start of execution is generated in step S3.

In step S4, B' denotes a set of basic blocks whose elements are child vertices v immediately subordinate to an entry vertex $v_{Entry}$ that represents the start point of the program. In step S5, a loop to repeat the following processes with respect to each element Bi of B' in the ascending order of i is started. In step S6, a procedure control program for $B_i$ is generated.

Figure 23:
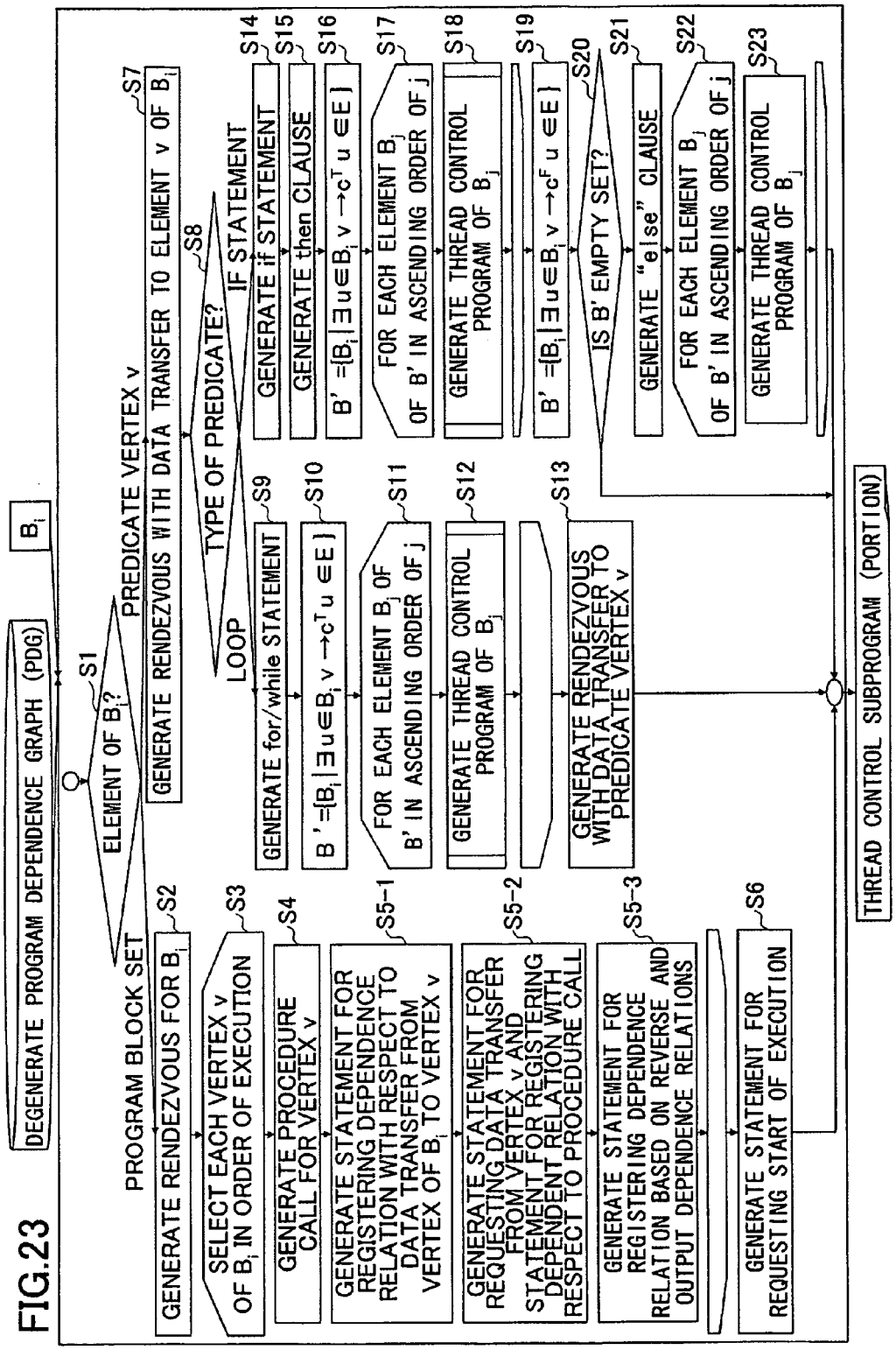
FIG. 23 is a flowchart illustrating the process of generating a procedure control program subordinate to an element $B_i$ of a basic block set B'.

FIG. 23 is a flowchart illustrating the process of generating a procedure control program subordinate to an element $B_i$ of the basic block set B'. The process illustrated in FIG. 23 corresponds to step S6 in FIG. 22. Data input into the process of FIG. 23 is the degenerate program dependence graph PDG and a basic block element $B_i$.

In step S1 of FIG. 23, the type of an element (i.e., vertex) of the basic block $B_i$ is determined. Determination of the type of the element of the basic block $B_i$ that is a vertex reveals whether the basic block $B_i$ is a set of program blocks or a predicate vertex.

If the determination in step S1 reveals that the basic block $B_i$ is a set of program blocks, statements for calling procedures corresponding to the vertices of the basic block $B_i$ and statements for registering dependence relations therebetween are generated. Specifically, in step S2, a rendezvous is generated with respect to the output data of a procedure that precedes the basic block $B_i$. In so doing, a rendezvous for data transfer is generated with respect to a flow dependence relation from outside the block to inside the block. Further, a rendezvous for the completion of a procedure or a data transfer is generated with respect to def-order relations, anti dependence relations, and output dependence relations. These are the rendezvous that guarantee the correct order of data writing and reading operations with respect to the similar variables set in memory. In this implementation, rendezvous are generated with respect to five edges as follows.

1) Loop-Carried Flow Dependence Edge to Vertex w of $B_i$: $v \to_{lc(L)} w$ $w \in B_i$ A rendezvous is generated with respect to data transfer from vertex v to vertex w.

2) Loop-Independent Flow Dependence Edge from Vertex v of $B_x$ (i≠x) to Vertex w of $B_i$: $v \to_{li} w$ $u \in B_x$ $w \in B_i$ (i≠x)

A rendezvous is generated with respect to data transfer from vertex v to vertex w.

3) Def-Order Relation to Vertex w of $B_i$: $v \to_{do(u)} w$ $w \in B_i$

A rendezvous is generated with respect to data transfer from vertex v to vertex u.

4) Anti Dependence Relation from Vertex v of $B_x$ (i≠x) to Vertex w of $B_i$: $v \to_{anti} w$ $v \in B_x$ $w \in B_i$ (i≠x)

4-1) Case of PE(v)=PE(w)

A rendezvous is generated with respect to a procedure call of vertex v.

4-2) Case of $\exists u \in v$ $w \to_f^x u \in E$ and PE(v)=PE(u)

A rendezvous is generated with respect to a procedure call of vertex v.

5) Output Dependence Relation from Vertex v of $B_x$ (i≠x) to Vertex w of $B_i$: $v \to_{output} w$ $v \in B_x$ $w \in B_i$ (i≠x)

5-1) Case of PE(v)=PE(w)

A rendezvous is generated with respect to data transfer ($\forall e=(v \to_f^x u) \in E$) regarding variable x from vertex v to all vertices u.

5-2) Case of $\exists u \in V$ $w \to_f^x u \in E$ and PE(v)=PE(u)

A rendezvous is generated with respect to data transfer ($\forall e=(v \to_f^x t) \in E$) regarding variable x from vertex v to all vertices t.

Namely, a rendezvous is generated without exceptions with respect to a loop-carried flow dependence edge, a loop-independent flow dependence edge, and a def-order relation while a rendezvous is generated only for the above-identified cases with respect to an anti dependence relation and an output dependence relation, for example. Anti dependence relations and output dependence relations for the cases other than the above-identified cases have been removed as previously described.

In step S3, a loop to repeat the following processes with respect to each vertex v in the basic block $B_i$ in the order of execution is started. In step S4, an asynchronous remote procedure call of vertex v is generated.

In step S5-1, a statement for registering a dependence relation is generated with respect to a loop-independent flow dependence relation from a vertex of the basic block $B_i$ to vertex v.

In step S5-2, a statement for requesting data transfer from vertex v belonging to the basic block $B_i$ to another processor is generated, and, also, a statement for registering a dependent relation of this data transfer is generated with respect to a preceding procedure call. This process is not performed for a vertex belonging to the similar processor since there is no need for data transfer in such a case. Here, a data transfer request is generated to transfer data directly to the processor executing a subsequent procedure without having an intervening control processor regardless of whether this data transfer crosses a border between basic blocks or does not cross such a border.

In step S5-3, a statement for registering a dependence relation based on an anti dependence relation and an output dependence relation is generated. Specifically, a dependence relation is registered with respect to two types of edges as follows.

1) Anti Dependence Relation from Vertex v of $B_i$ to Vertex w of $B_i$: $v \to_{anti}^x w$ v, w $\in B_i$ 1-1) Case of PE(v)=PE(w)

A dependence relation from a procedure call of vertex v to a procedure call of vertex w is registered.

1-2) Case of $\exists u \in V$ $w \to_f^x u \in E$ and PE(v)=PE(u)

A dependence relation from a procedure call of vertex v to a data transfer corresponding to w→u is registered.

2) Output Dependence Relation from Vertex v of $B_i$ to Vertex w of $B_i$: $v \to_{output}^x w$ v, $w \in B_i$ 2-1) Case of PE(v)=PE(w)

A dependence relation is generated with respect to a procedure call of vertex w in relation to data transfer ($\forall e=(v \to_f^x u) \in E$) regarding variable x from vertex v to all vertices u.

2-2) Case of $\exists u \in v$ $w \to_f^x u \in E$ and PE(v)=PE(u)

A dependence relation is generated with respect to data transfer corresponding to w→u in relation to data transfer ($\forall e=(v \to_f^x u) \in E$) regarding variable x from vertex v to all vertices t.

The process described above is repeatedly performed with respect to all vertices v of the basic block $B_i$, and, then, a statement to request the start of execution is generated in step S6.

If the check in step S1 finds that the basic block $B_i$ is a predicate vertex v, a control structure representing vertex v will be generated. In step S7, a rendezvous is generated with respect to a procedure preceding the element v of the basic block $B_i$. Namely, a statement for making a rendezvous with a preceding procedure is generated with respect to an input flow dependence edge in order to fix the values of variables referred in a conditional expression. Here, a rendezvous for the completion of a procedure of an outputting vertex is generated with respect to two types of data dependence edges, i.e., a loop-carried flow dependence edge carried by the loop outside the vertex and a loop-independent flow dependence edge incident to the vertex.

In step S8, the type of the predicate of vertex v is checked. If the predicate is a loop, the procedure proceeds to step S9. If the predicate is an if statement, the procedure proceeds to step S14.

If the check in step S8 indicates a loop, a statement to generate a "for" statement or a "while" statement corresponding to an original sequential program is generated in step S9. In step S10, a set of basic blocks whose elements are vertices u having L=T control dependence relations on vertex v is denoted as B'. In step S11, a loop to repeat the following processes with respect to each element Bi of B' in the ascending order of i is started. In step S12, a procedure control program for $B_i$ is generated. Step S12 has a nested structure. Execution of step S12 with respect to $B_i$ corresponds to the execution of the entire flowchart of FIG. 22 with respect to $B_i$.

After the completion of the loop, in step S13, a rendezvous is generated with respect to the completion of a preceding procedure from which an edge incident to vertex v emanates and carried by the loop. This corresponds to the addition of a statement at the end of the body text to make a rendezvous with data input into a conditional expression since the condition check is performed across the loop (i.e., a self-loop-carried input flow dependence edge).

If the check in step S8 indicates an "if" statement, an "if" statement is generated in step S14. In step S15, a "then" clause is generated. In step S16, a set of basic blocks whose elements are vertices u having L=T control dependence relations on vertex v is denoted as B'. In step S17, a loop to repeat the following processes with respect to each element Bi of B' in the ascending order of i is started. In step S18, a procedure control program for $B_i$ is generated. Step S18 has a nested structure. Execution of step S18 with respect to $B_i$ corresponds to the execution of the entire flowchart of FIG. 22 with respect to $B_i$. Statements generated by steps S17 and S18 constitute the body text of the "then" clause.

In step S19, a set of basic blocks whose elements are vertices u having L=F control dependence relations on vertex v is denoted as B'. In step S20, a check is made as to whether the basic block set B' is an empty set. If it is an empty set, the procedure comes to an end. If the basic block set B' is not an empty set, an "else" clause is generated in step S21. In step S22, a loop to repeat the following processes with respect to each element Bi of B' in the ascending order of i is started. In step S23, a procedure control program for $B_i$ is generated. Step S23 has a nested structure. Execution of step S23 with respect to $B_i$ corresponds to the execution of the entire flowchart of FIG. 22 with respect to $B_i$. Statements generated by steps S22 and S23 constitute the body text of the "else" clause.

Figure 24:
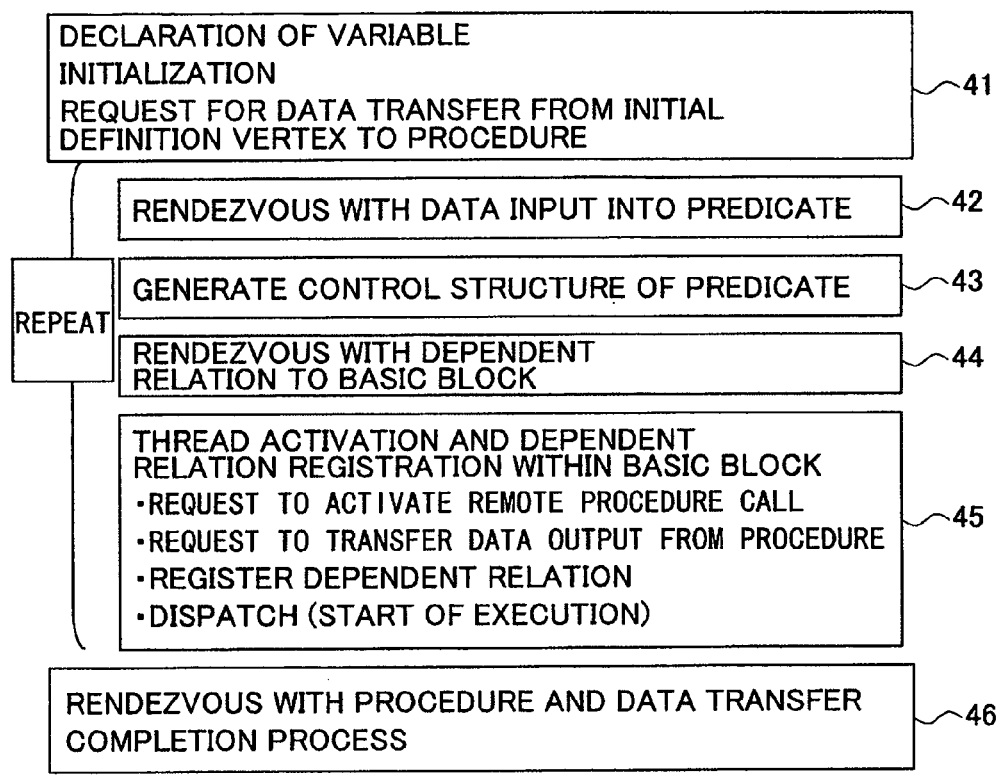
FIG. 24 is a drawing illustrating a structure of a procedure control program.

Through the procedure described above, a procedure control program subordinate to the basic block $B_i$ is generated. FIG. 24 is a drawing illustrating the structure of a procedure control program according to the first embodiment.

As illustrated in FIG. 24, the control program in the first embodiment includes a variable declaration initialization section 41, a predicate input data rendezvous section 42, a predicate control structure generation section 43, a basic block dependence relation rendezvous section 44, an intra-basic-block thread activation and dependence relation registration section 45, and a procedure-&-data-transfer rendezvous completion section 46. The intra-basic-block thread activation and dependence relation registration section 45 requests an activation of an asynchronous remote procedure call, a transfer of procedure output data, a registration of dependence relation, and a dispatch of a procedure (i.e., a start of execution).

Here, a program block is called as a procedure. Since a shared memory is used in this case, it is assumed that input data has already been transferred to executing processors. To this end, data areas for input and output variables are prepared in advance. Further, execution results are stored in the executing processors, and are then transferred to a processor which is to use the results as appropriate (such data transfer is controlled by the control program). Then, variables to be used and defined in the subprogram of the vertex other than the input variables are obtained, and variable declaration statements are generated. The subprogram is output, followed by generating a statement to assign values to the output variables at appropriate addresses.

In the following, a second embodiment will be described. The second embodiment corresponds to a method that generates variable copy areas to be used on a procedure-specific basis. In the following, a description will be given of points where the second embodiment differs from the first embodiment. With respect to the points for which no description is given, the second embodiment is substantially the similar to the first embodiment.

Figure 25:
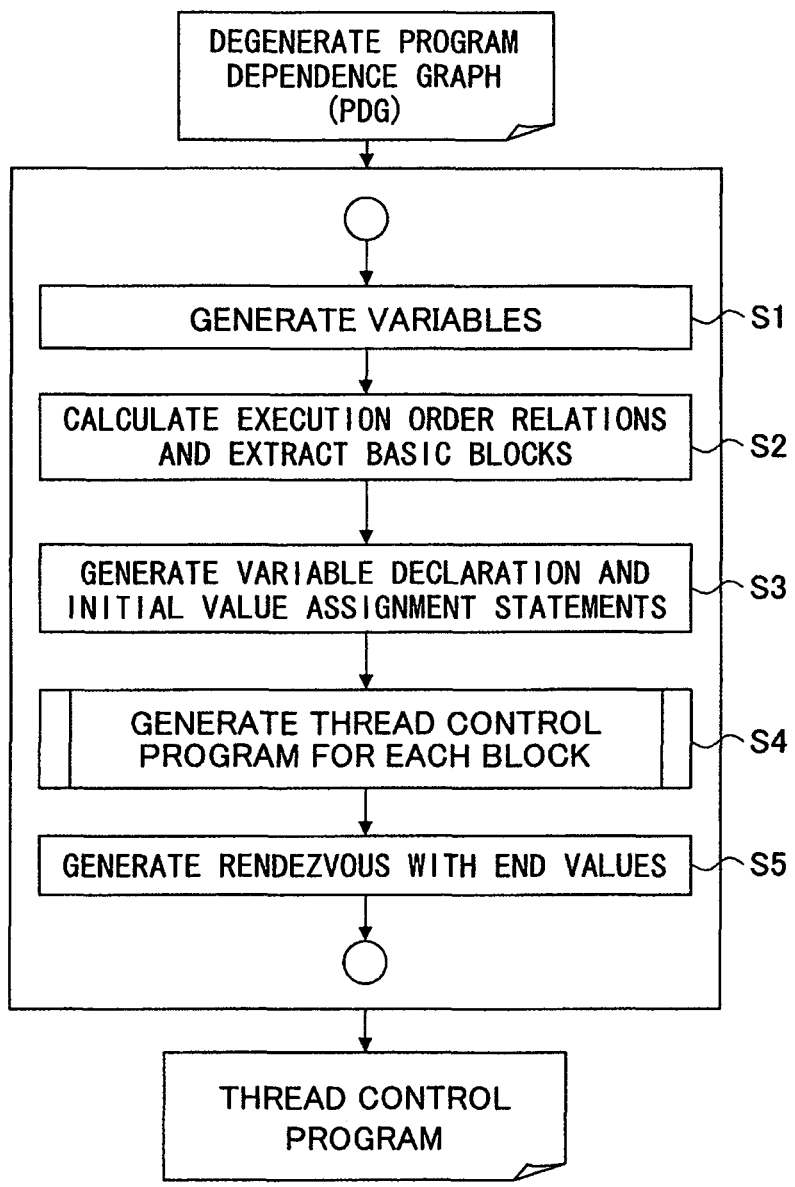
FIG. 25 is a flowchart illustrating a method of generating a procedure control program according to a second embodiment.

FIG. 25 is a flowchart illustrating the method of generating a procedure control program according to the second embodiment. In step S1, variables are generated. Namely, vertex-specific (i.e., procedure-specific) variables to be read and written by a program block vertex are generated at a processor that executes this vertex. Further, the names of these variables are changed in order to use the variables. With the generation of variables on a procedure-specific basis as described above, anti dependence relations and output dependence relations are reduced, thereby providing greater latitude in obtaining a def-order relation. In consideration of this, the order of step S1 and step S2 is reversed in comparison with the first embodiment.

In step 2, execution order relations between vertices are calculated, followed by extracting basic blocks based on the obtained execution orders (i.e., control flows). This process is similar to step S1 of FIG. 6 described in the first embodiment. It is to be noted that the generation of variables on a procedure-specific basis as described above serves to reduce all the anti dependence relations and output dependence relations. The anti dependence relations and output dependence relations are thus not extracted.

In step S3, control program variables and initial value assignment statements are generated. In so doing, parallelism may be improved by performing conversion into a static single assignment form (see page 320 of Non-Patent Document 5). As for variables, variables for use in data transfer are generated.

In step S4, a search is conducted with respect to a control dependence subgraph in the similar sequence as the execution orders obtained in step S2 thereby to generate a control program. A control structure represented by a vertex is generated with respect to a predicate vertex. Then, a control program corresponding to a sub-tree subordinate to the vertex is generated as body statements of the control structure. Statements for performing dependence-relation-based asynchronous remote procedure calls and data transfers are generated with respect to the basic blocks. This process is substantially the similar to the process illustrated in FIG. 22 of the first embodiment. The process of generating a procedure control program for the basic block $B_i$ (i.e., process corresponding to step S6 of FIG. 22) differs from that of the first embodiment.

In step S5, statements for making a rendezvous with (i.e., performing a wait for) the completion of a procedure are generated.

Figure 26:
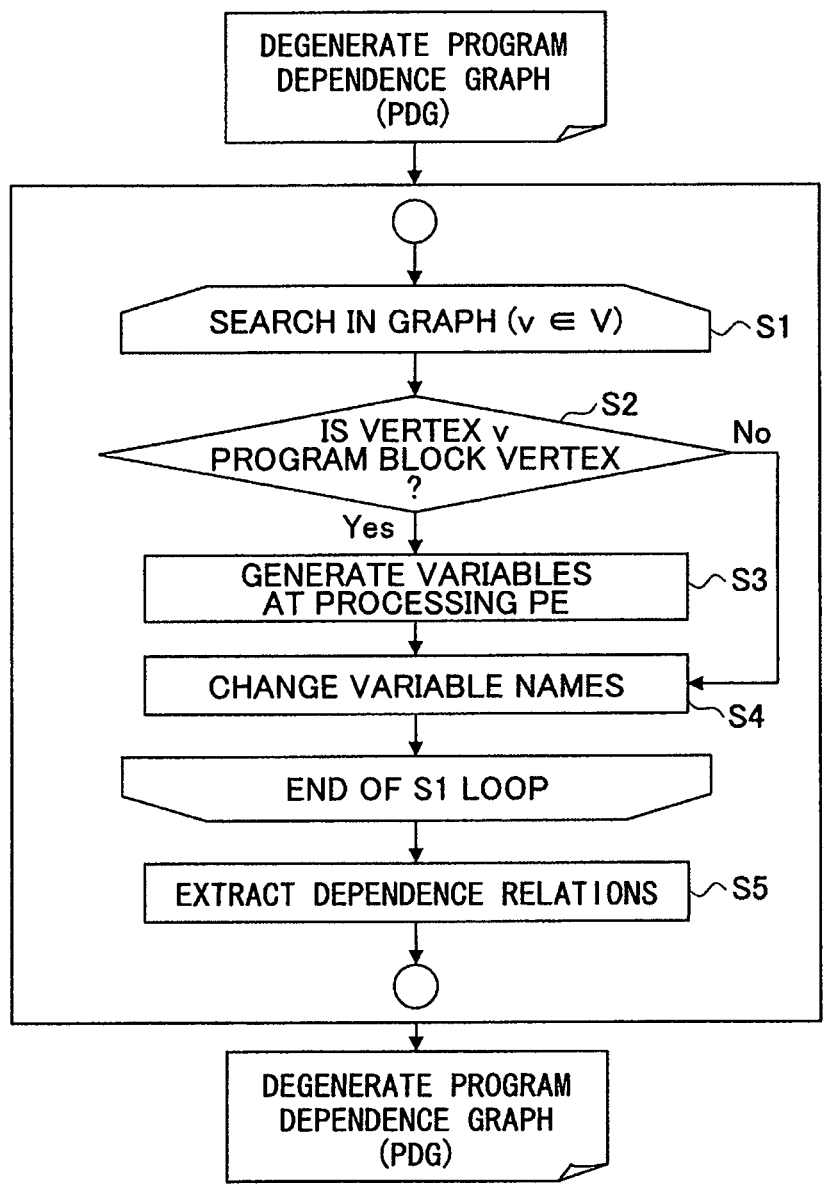
FIG. 26 is a flowchart illustrating the process of generating variables on a procedure-specific basis.

FIG. 26 is a flowchart illustrating the process of generating variables on a procedure-specific basis. The process illustrated in FIG. 26 corresponds to the process of step S1 in FIG. 25.

In step S1, a loop to repeat the following processes with respect to each vertex v in the degenerate program dependence graph is started.

In step S2, a check is made as to whether variables corresponding to a vertex v of interest have already been created for a processor that is to perform a procedure of the vertex if the vertex of interest is a program block vertex. If variables have already been created for the executing processor, the procedure proceeds to step S4. If variables have not already been created for the executing processor, variables are created in step S3, and, then, the procedure proceeds to step S4.

In step S4, variable names are changed. If variable x has been created for procedure P1 of processor PE1, for example, its name is changed to a variable name (e.g., PE1_P1_x) indicating that this variable x belongs to the procedure P1 of the processor PE1. The processes are described above are performed with respect to each vertex in the degenerate program dependence graph. Thereafter, dependence relations are extracted in step S5.

As previously described, the process of generating a control program in step S4 of FIG. 25 according to the second embodiment is similar to the process of FIG. 22 of the first embodiment. The process of generating a procedure control program for the basic block $B_i$ (i.e., process corresponding to step S6 of FIG. 22) differs from that of the first embodiment.

Figure 27:
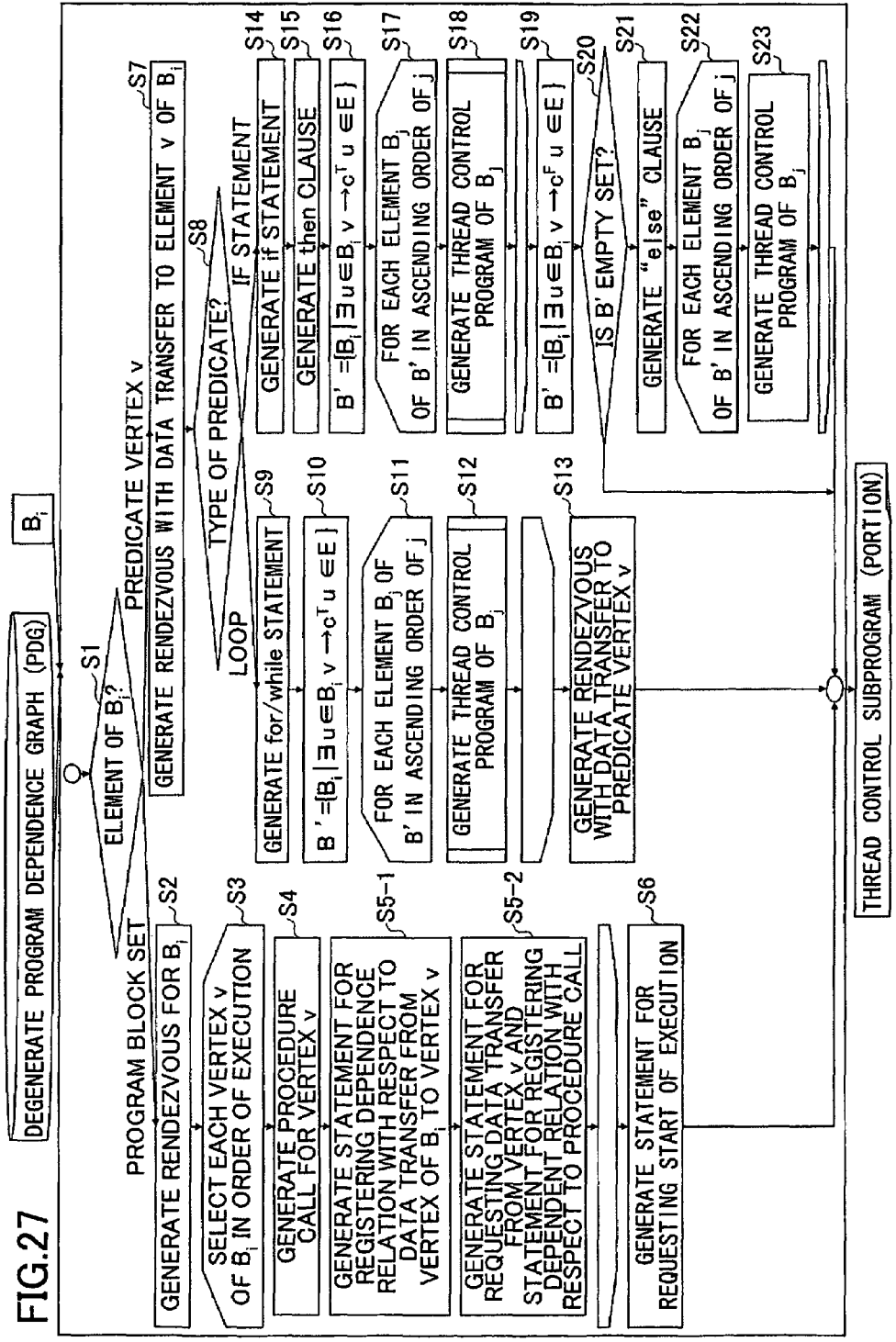
FIG. 27 is a flowchart illustrating the process of generating a procedure control program subordinate to an element $B_i$ of a basic block set B' according to at second embodiment.

FIG. 27 is a flowchart illustrating the process of generating a procedure control program subordinate to an element $B_i$ of the basic block set B' according to the second embodiment. Data input into the process of FIG. 27 is the degenerate program dependence graph PDG and a basic block element $B_i$. In the following, a description will be given of points where the flowchart of FIG. 27 differs from the flowchart of FIG. 23. A description of points at which these two flowcharts coincide will be omitted.

In step S2 of FIG. 27, a rendezvous is generated with respect to a procedure preceding the basic block $B_i$, but anti dependence relations and output dependence relations are not taken into consideration. In this implementation, therefore, rendezvous are generated with respect to three edges as follows.

1) Loop-Carried Flow Dependence Edge to Vertex w of $B_i$: $u \rightarrow_{lc(L)} w \ w \in B_i$ A rendezvous is generated with respect to data transfer from vertex v to vertex w.

2) Loop-Independent Flow Dependence Edge from Vertex u of $B_x$ (i≠x) to Vertex w of $B_i$: $u \rightarrow_{li} w \ u \in B_x \ w \in B_i (i \neq x)$ A rendezvous is generated with respect to data transfer from vertex v to vertex w.

3) Def-Order Relation to Vertex w of $B_i$: $u \rightarrow_{do(t)} w \ w \in B_i$ A rendezvous is generated with respect to data transfer from vertex v to vertex t.

The second embodiment illustrated in FIG. 27, it is proper not to take into account anti dependence relations and output dependence relations, so that a process corresponding to the step S5-3 of FIG. 23 is not performed. Namely, it is proper not to generate a statement for registering a dependence relation based on an anti dependence relation and an output dependence relation.

Through the procedure described above, a control program in the second embodiment is generated. The structure of a procedure control program according to the second embodiment is similar to the structure of a procedure control program according to the first embodiment. The generation of statements is also similar to that of the first embodiment.

In the following, a third embodiment will be described. The third embodiment corresponds to a method that creates a copy area for a variable to be used on a processor-specific basis as a default, with an option to create separate areas on a procedure-specific basis if it may be possible to reduce rendezvous based on anti dependence relations or output dependence relations.

Figure 28:
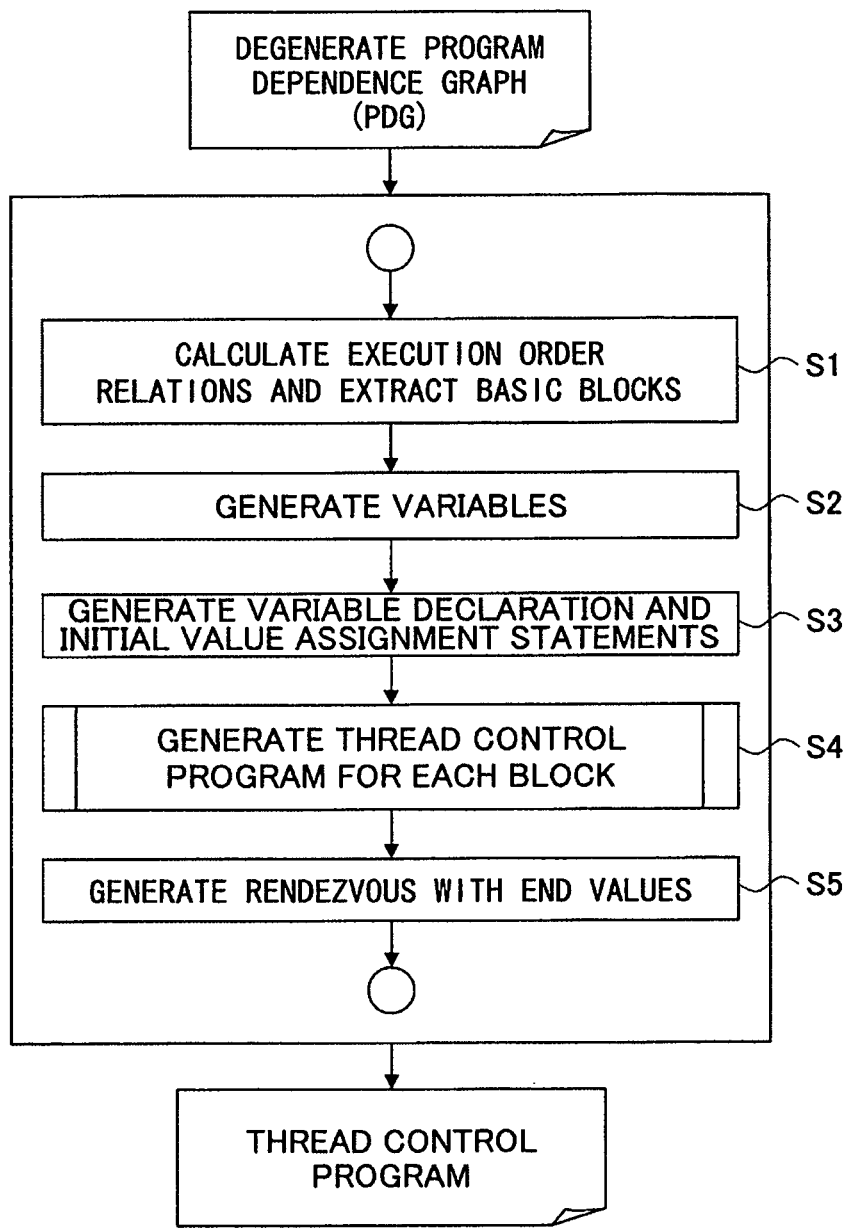
FIG. 28 is a flowchart illustrating a method of generating a procedure control program according to a third embodiment.

FIG. 28 is a flowchart illustrating the method of generating a procedure control program according to the third embodiment.

In step 1, execution order relations between vertices are calculated, followed by extracting basic blocks based on the obtained execution orders (i.e., control flows). A degenerate program dependence graph represents only data dependence relations and control dependence relations, for example, and does not explicitly indicate execution orders between vertices. Provision is thus purposefully made to reconstruct proper control flows from the graph. To this end, the execution orders of intermediate nodes are calculated with respect to a control dependence sub-tree of the degenerated program dependence graph. Partial order relations between vertices are obtained as a result. A control program will then be generated by use of the execution order relations. In so doing, anti dependence relations and output dependence relations are extracted. Further, basic blocks are extracted from the obtained execution orders (i.e., control flows). This process is substantially identical to step S1 of FIG. 6 described in the first embodiment.

In step S2, variables are generated. Namely, variables to be read and written by a program block vertex are generated at a processor that executes this vertex. Further, the names of these variables are changed in order to use the variables. In this embodiment, a copy area for a variable to be used on a processor-specific basis is created as a default, followed by checking anti dependence relations and output dependence relations, and then creating separate areas on a procedure-specific basis if it may be possible to reduce rendezvous based on the anti dependence relations or output dependence relations.

In step S3, control program variables and initial value assignment statements are generated. In so doing, parallelism may be improved by performing conversion into a static single assignment form (see page 320 of Non-Patent Document 5). As for variables, variables for use in data transfer are generated.

In step S4, a search is conducted with respect to a control dependence subgraph in the similar sequence as the execution orders obtained in step S2 thereby to generate a control program. A control structure represented by a vertex is generated with respect to a predicate vertex. Then, a control program corresponding to a sub-tree subordinate to the vertex is generated as body statements of the control structure. Statements for performing dependence-relation-based asynchronous remote procedure calls and data transfers are generated with respect to the basic blocks. This process is substantially the similar to the process illustrated in FIG. 22 of the first embodiment. The process of generating a procedure control program for the basic block $B_i$ (i.e., process corresponding to step S6 of FIG. 22) is substantially identical to the corresponding process of the second embodiment.

In step S5, statements for making a rendezvous with (i.e., performing a wait for) the completion of a procedure are generated.

Figure 29:
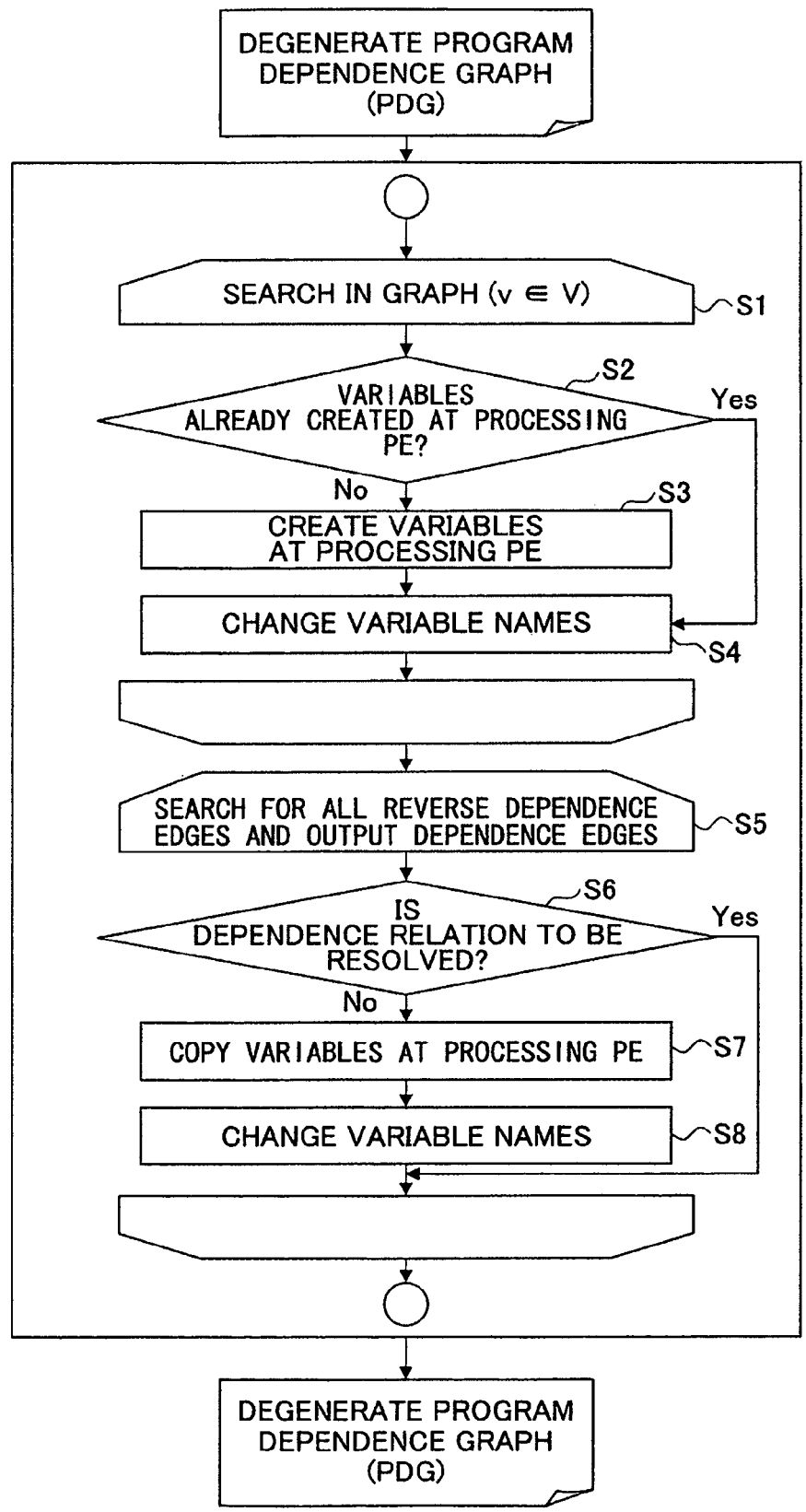
FIG. 29 is a flowchart illustrating the process of generating variables.

FIG. 29 is a flowchart illustrating the process of generating variables. The process illustrated in FIG. 29 corresponds to the process of step S2 in FIG. 28.

In step S1, a loop to repeat the following processes with respect to each vertex v in the degenerate program dependence graph is started.

In step S2, a check is made as to whether variables corresponding to a vertex v of interest have already been created for a processor that is to perform a procedure of the vertex if the vertex of interest is a program block vertex. If variables have already been created for the executing processor, the procedure proceeds to step S4. If variables have not already been created for the executing processor, variables are created in step S3, and, then, the procedure proceeds to step S4.

In step S4, variable names are changed. If variable x has been created for processor PE1, for example, its name is changed to a variable name (e.g., PE1_x) indicating that this variable x belongs to the processor PE1. The processes are described above are performed with respect to each vertex in the degenerate program dependence graph.

In step S5, thereafter, all the reserve dependence relations and output dependence relations are selected one after another to perform the following processes with respect to each selected dependence relation.

In step S6, a check is made as to whether a dependence relation (i.e., anti dependence relation or output dependence relation) of interest has been resolved by the variable name changes performed in step S4. The check as to whether the dependence relation has been resolved is similar to the check in step S5 of FIG. 21 as to whether a dependence relation has been resolved and removed. The dependence relation that has been resolved is removed at this point. If the dependence relation has not been resolved, variables corresponding to the dependence relation of interest are copied and created in step S7 at the processor executing the process. The procedure then proceeds to step S8.

In step S8, variable names are changed. Namely, if variable x for procedure Pi and variable x for procedure P2 have already been created at processor PE1, for example, their names are changed to variable names such as PE1_P1_x and PE_P2_x that are unique to each procedure of each processor. The procedure described above is repeated with respect to each anti dependence relation and each output dependence relation.

As previously described, the process of generating a control program in step S4 of FIG. 28 according to the third embodiment is similar to the process of FIG. 22 of the first embodiment. However, the process of generating a procedure control program for the basic block $B_i$ (i.e., process corresponding to step S6 of FIG. 22) is identical to the corresponding process of the second embodiment, i.e., the process illustrated in the flowchart of FIG. 27. Namely, the registration of rendezvous and dependence relations is not performed with respect to anti dependence relations and output dependence relations since it is proper not to take into account the anti dependence relations and output dependence relations.

Through the procedure described above, a control program in the third embodiment is generated. The structure of a procedure control program according to the third embodiment is similar to the structure of a procedure control program according to the first embodiment. The generation of statements is also similar to that of the first embodiment.

In the following, fourth through sixth embodiments will be described. The fourth through sixth embodiments correspond to the first through third embodiments, respectively, with a modification to increase the speed of data transfer with respect to def-order relations.

Figure 30:
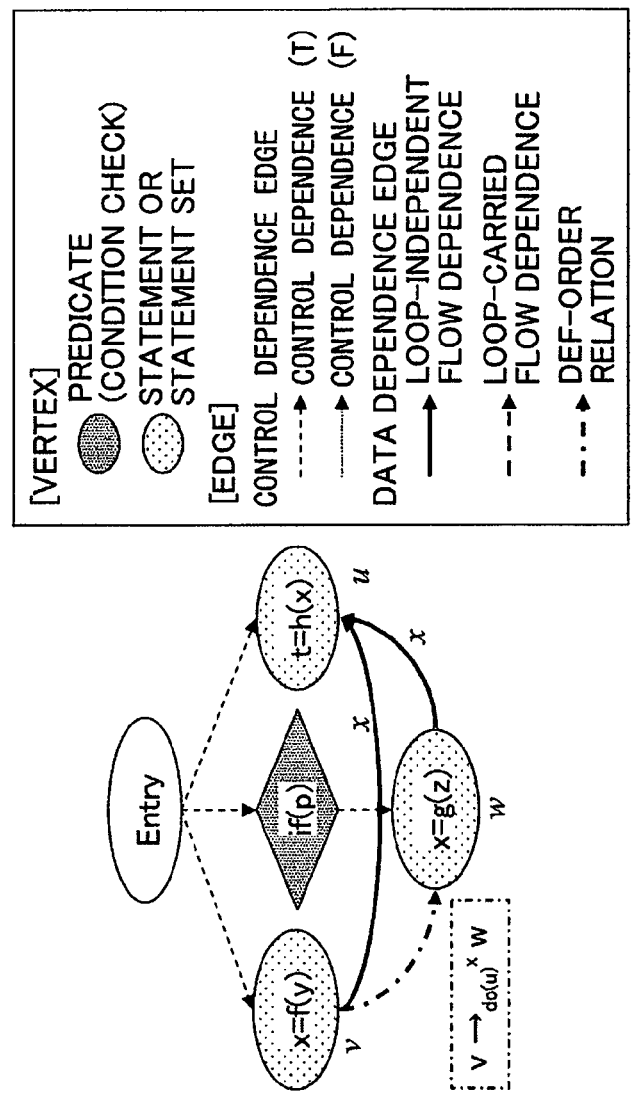
FIGS. 30A and 30B are drawings illustrating a portion of an original sequential program and a corresponding degenerate program dependence graph, respectively.

FIGS. 30A and 30B are drawings illustrating a portion of an original sequential program and a corresponding degenerate program dependence graph, respectively. A program dependence graph is generated from the original sequential program illustrated in FIG. 30A, and, then, is degenerated by merging its vertices as appropriate to generate a degenerate program dependence graph illustrated in FIG. 30B.

When either the value of x defined at vertex v or the value of x defined at vertex w is possibly used at vertex u, a def-order dependence relation exists from x of vertex v to x of vertex w with respect to vertex u. The value of variable x obtained by the procedure of vertex v and the value of variable x obtained by the procedure of vertex w are both transferred to vertex u. At the time of execution at vertex v, the result of determination of the conditional expression "if(p)" is not yet decided, and, thus, which one of the defined values is to be used at vertex u is not yet decided. In consideration of this, the result of vertex v is speculatively transferred to vertex u. This preceding transfer is canceled upon finding by the condition check that the transferred value is to be overwritten. The result of vertex w is then transferred to vertex u. Such provision may be implemented by use of a method of generating an explicit request to cancel data transfer or a method of utilizing a multiprocessor-based parallel program executing apparatus that cancels data transfer upon finding an error of speculative execution and starts correct data transfer. In the following, a description will be given of an example in which the method of generating an explicit request to cancel data transfer is used.

In the following, a fourth embodiment will be described. The fourth embodiment differs from the first embodiment in the details of the process of step S2 in FIG. 23 that illustrates the process of generating a procedure control program for a basic block $B_i$. The remaining processes are identical between the first embodiment and the fourth embodiment.

In the first embodiment, a rendezvous is generated with respect to a def-order relation in step S2 of the procedure (FIG. 23) of generating a procedure control program for the basic block $B_i$. In the fourth embodiment, on the other hand, a cancellation of data transfer u→,t is generated (i.e., explicit cancellation) with respect to the def-order relation "u→do (t)w w∈Bi" to vertex w of $B_i$ in step S2 of the procedure (FIG. 23) of generating a procedure control program for the basic block $B_i$. Namely, a preceding data transfer is cancelled with respect to a def-order relation, rather than generating a rendezvous. If libraries are used in implementation, a preceding data transfer is cancelled by an overwriting data transfer request provided in the basic block. No cancellation is thus necessary in such a case.

In the manner described above, the fourth embodiment has requests to cancel data transfer with respect to def-order relations in addition to the configuration used for the first embodiment, thereby further, improving processing speed.

In the following, a fifth embodiment will be described. The fifth embodiment differs from the second embodiment in the details of the process of step S2 in FIG. 23 that illustrates the process of generating a procedure control program for a basic block $B_i$. The remaining processes are identical between the second embodiment and the fifth embodiment.

In the second embodiment, a rendezvous is generated with respect to a def-order relation in step S2 of the procedure (FIG. 23) of generating a procedure control program for the basic block $B_i$. In the fifth embodiment, on the other hand, a cancellation of data transfer u→,t is generated (i.e., explicit cancellation) with respect to the def-order relation "u→do (t)w w∈Bi" to vertex w of $B_i$ in step S2 of the procedure (FIG. 23) of generating a procedure control program for the basic block $B_i$. Namely, a preceding data transfer is cancelled with respect to a def-order relation, rather than generating a rendezvous. If libraries are used in implementation, a preceding data transfer is cancelled by an overwriting data transfer request provided in the basic block. No cancellation is thus necessary in such a case.

In the manner described above, the fifth embodiment has requests to cancel data transfer with respect to def-order relations in addition to the configuration used for the second embodiment, thereby further, improving processing speed.

In the following, a sixth embodiment will be described. The sixth embodiment differs from the third embodiment in the details of the process of step S2 in FIG. 23 that illustrates the process of generating a procedure control program for a basic block $B_i$. The remaining processes are identical between the third embodiment and the sixth embodiment.

In the third embodiment, a rendezvous is generated with respect to a def-order relation in step S2 of the procedure (FIG. 23) of generating a procedure control program for the basic block $B_i$. In the sixth embodiment, on the other hand, a cancellation of data transfer u→ⱼt is generated (i.e., explicit cancellation) with respect to the def-order relation "u→do (t)w w∈Bi" to vertex w of $B_i$ in step S2 of the procedure (FIG. 23) of generating a procedure control program for the basic block $B_i$. Namely, a preceding data transfer is cancelled with respect to a def-order relation, rather than generating a rendezvous. If libraries are used in implementation, a preceding data transfer is cancelled by an overwriting data transfer request provided in the basic block. No cancellation is thus necessary in such a case.

In the manner described above, the sixth embodiment has requests to cancel data transfer with respect to def-order relations in addition to the configuration used for the third embodiment, thereby further, improving processing speed.

Figure 31:
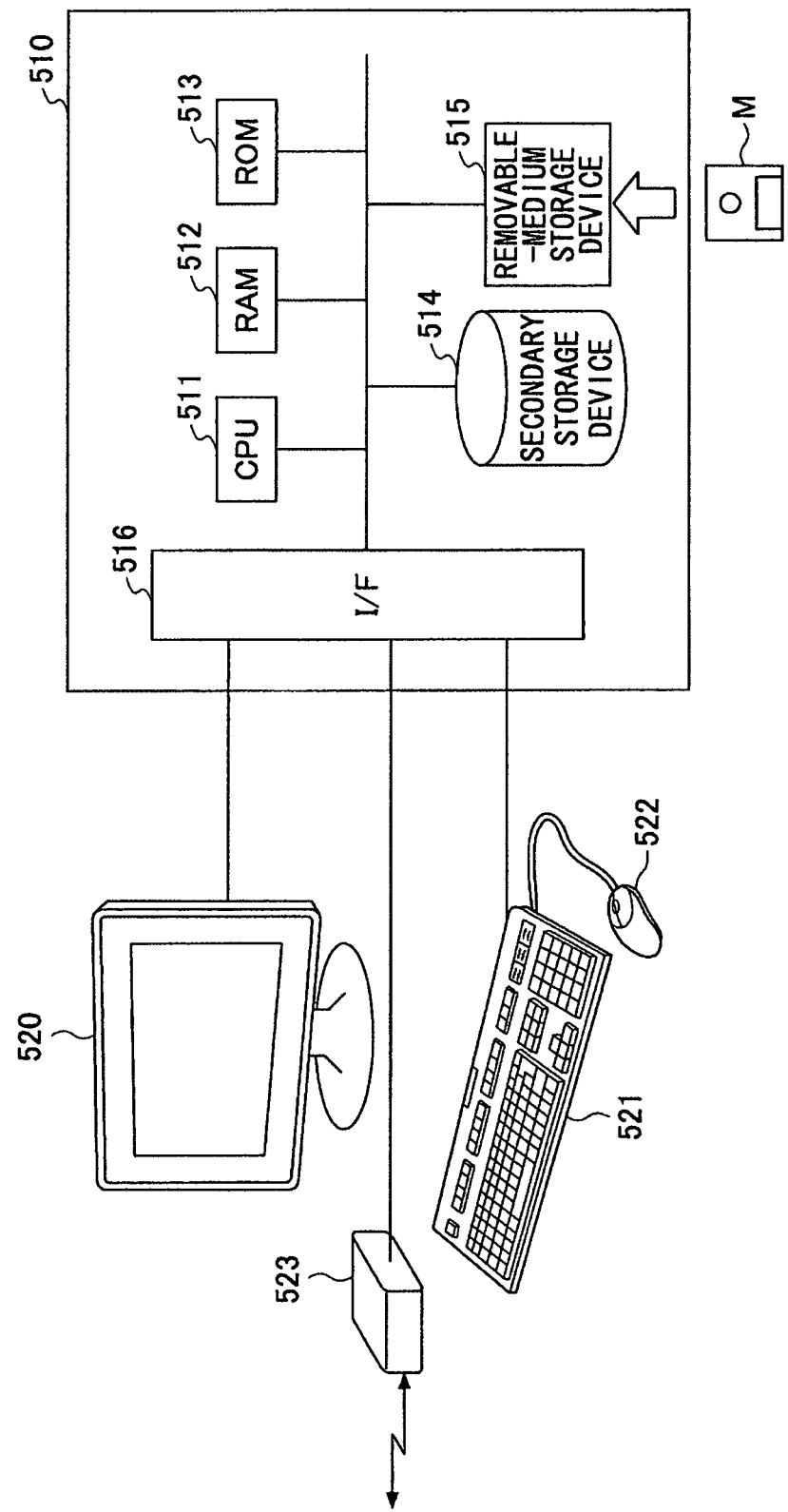
FIG. 31 is a drawing illustrating the configuration of an apparatus for performing a parallelized program generating method.

FIG. 31 is a drawing illustrating the configuration of an apparatus for performing the parallelized program generating method.

As illustrated in FIG. 31, the apparatus for performing the parallelized program generating method is implemented as a computer such as a personal computer, an engineering workstation, or the like The apparatus of FIG. 31 includes a computer 510, a display apparatus 520 connected to the computer 510, a communication apparatus 523, and an input apparatus. The input apparatus includes a keyboard 521 and a mouse 522. The computer 510 includes a CPU 511, a ROM 513, a secondary storage device 514 such as a hard disk, a removable-medium storage device 515, and an interface 516.

The keyboard 521 and mouse 522 provide user interface, and receive various commands for operating the computer 510 and user responses responding to data requests or the like. The display apparatus 520 displays the results of processing by the computer 510, and further displays various data that makes it possible for the user to communicate with the computer 510, for example. The communication apparatus 523 provides for communication to be conduced with a remote site, and may include a modem, a network interface, or the like.

The parallelized program generating method is provided as a computer program executable by the computer 510. This computer program is stored in a memory medium M that is mountable to the removable-medium storage device 515. The computer program is loaded to the RAM 512 or to the secondary storage device 514 from the memory medium M through the removable-medium storage device 515. Alternatively, the computer program may be stored in a remote memory medium (not shown), and is loaded to the RAM 512 or to the secondary storage device 514 from the remote memory medium through the communication apparatus 523 and the interface 516.

Upon user instruction for program execution entered through the keyboard 521 and/or the mouse 522, the CPU 511 loads the program to the RAM 512 from the memory medium M, the remote memory medium, or the secondary storage device 514. The CPU 511 executes the program loaded to the RAM 512 by use of an available memory space of the RAM 512 as a work area, and continues processing while communicating with the user as such a need arises. The ROM 513 stores therein control programs for the purpose of controlling basic operations of the computer 510.

By executing the computer program (i.e., the parallelized program generating program, which is a parallelized program generating compiler) as described above, the computer 510 performs the parallelized program generating method as described in the embodiments.

According to at least one embodiment, a parallelized program is not generated based on a control flow graph, but is generated based on a program dependence graph which indicates control dependence relations, so that parallelism across control flows (i.e., branches) is extracted from the program. Further, the program dependence graph is degenerated to reduce the size of the graph, which makes it possible to streamline and optimize a subsequent process of generating a parallelized program, for example. This also achieves parallelism at large granularity.

As for dependence relations between procedures across different basic blocks, a subsequent procedure is executed after waiting for the completion of a preceding procedure. Procedures having dependence relations with each other within the similar basic block are executed by use of asynchronous remote procedure calls with a dependence-relation-based wait. Namely, procedures having a dependence relation crossing a border between basic blocks are controlled such that an instruction to execute a subsequent procedure is placed after an instruction to wait for output data transfer of a preceding procedure, thereby utilizing the sequence of these instructions to inexplicitly specify and satisfy the dependence relation. Further, procedures having a dependence relation within the similar basic block are controlled such that an instruction is generated to explicitly register a subsequent procedure's dependence on output data transfer from a preceding procedure to the subsequent procedure, thereby satisfying the dependence relation. With such a configuration, the generation of control programs is made easier by implementing procedure execution based on a wait mechanism with respect to complex control dependence relations between basic blocks, and, also, a needless waiting time is eliminated by use of an asynchronous remote procedure call with a dependence-relation-based wait within the similar basic block in which execution sequence is fixed.

Further, an instruction to perform a direct data transfer from procedure to procedure is generated for each of a data transfer within the similar basic block and a data transfer across basic blocks. This allows data to be directly transferred between procedure executing processors without using an intervening control processor, thereby streamlining the processes of the parallelized program.

Although the embodiments of the present invention are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method of generating a parallelized program, comprising:
   generating a program dependence graph from a sequential program, the program dependence graph having vertices representing statements constituting the sequential program and edges between the vertices representing relations between the statements;
   merging the vertices of the program dependence graph to generate a degenerate program dependence graph in which a number of vertices is reduced;
   calculating an execution order of vertices of the degenerate program dependence graph;
   generating basic blocks each of which is made by consolidating vertices including neither branching nor merging and to be executed in sequence among the vertices for which the execution order has been calculated;
   generating procedures each corresponding to a respective one of the vertices of the degenerate program dependence graph; and
   generating a procedure control program by arranging an instruction to execute a first one of the procedures after an instruction to wait for output data transfer from a second one of the procedures for the first and second ones of the procedures that have a dependence relation crossing a border between the basic blocks, generating an instruction to register dependence of a third one of the procedures on output data transfer from a fourth one of the procedures for the third and fourth ones of the procedures that have a dependence relation within one of the basic blocks, and generating an instruction to perform a given data transfer directly from procedure to procedure and an instruction to register dependence of the given data transfer on a preceding procedure for each of a data transfer within one of the basic blocks and a data transfer crossing a border between the basic blocks, wherein the generated procedure control program is to control execution of the procedures.

2. The method as claimed in claim 1, wherein the procedure control program is generated to create variables on a processor-specific basis for each processor that executes corresponding one or more of the procedures.

3. The method as claimed in claim 1, wherein the procedure control program is generated to create variables on a procedure-specific basis for each of the procedures.

4. The method as claimed in claim 1, wherein the procedure control program is generated to create variables on a processor-specific basis for each processor that executes corresponding one or more of the procedures and to further create variables on a procedure-specific basis for each of the procedures for variables for which dependence relations are to be resolved by creating variables on a procedure-specific basis.

5. The method as claimed in claim 1, wherein the procedure control program is generated to produce an instruction to cancel a preceding data transfer with respect to a def-order relation.

6. An apparatus for generating a parallelized program, comprising:
   a memory configured to store a sequential program and a parallelized-program generating program; and
   a computing unit configured to execute the parallelized-program generating program stored in the memory to generate a parallelized program from the sequential program stored in the memory,
   wherein the computing unit executes the parallelized-program generating program to perform:
   generating a program dependence graph having vertices representing statements constituting the sequential program and edges between the vertices representing relations between the statements;
   merging the vertices of the program dependence graph to generate a degenerate program dependence graph in which a number of vertices is reduced;
   calculating an execution order of vertices of the degenerate program dependence graph;
   generating a basic block by consolidating vertices including neither branching nor merging and to be executed in sequence among the vertices for which the execution order has been calculated;
   generating procedures each corresponding to a respective one of the vertices of the degenerate program dependence graph; and
   generating a procedure control program by arranging an instruction to execute a first one of the procedures after an instruction to wait for output data transfer from a second one of the procedures for the first and second ones of the procedures that have a dependence relation crossing a border between the basic blocks, generating an instruction to register dependence of a third one of the procedures on output data transfer from a fourth one of the procedures for the third and fourth ones of the procedures that have a dependence relation within one of the basic blocks, and generating an instruction to perform a given data transfer directly from procedure to procedure and an instruction to register dependence of the given data transfer on a preceding procedure for each of a data transfer within one of the basic blocks and a data transfer crossing a border between the basic blocks, wherein the generated procedure control program is to control execution of the procedures.

7. The apparatus as claimed in claim 6, wherein the computing unit generates the procedure control program to create variables on a processor-specific basis for each processor that executes corresponding one or more of the procedures.

8. The apparatus as claimed in claim 6, wherein the computing unit generates the procedure control program to create variables on a procedure-specific basis for each one of the procedures.

9. The apparatus as claimed in claim 6, wherein the computing unit generates the procedure control program to create variables on a processor-specific basis for each processor that executes corresponding one or more of the procedures and to further create variables on a procedure-specific basis for each of the procedures for variables for which dependence relations are to be resolved by creating variables on a procedure-specific basis.

10. A non-transitory computer-readable recording medium having a parallelized-program generating program embodied therein, said parallelized-program generating program comprising program codes for causing a computer to perform:

generating a program dependence graph from a sequential program, the program dependence graph having vertices representing statements constituting the sequential program and edges between the vertices representing relations between the statements;

merging the vertices of the program dependence graph to generate a degenerate program dependence graph in which a number of vertices is reduced;

calculating an execution order of vertices of the degenerate program dependence graph;

generating a basic block by consolidating vertices including neither branching nor merging and to be executed in sequence among the vertices for which the execution order has been calculated;

generating procedures each corresponding to a respective one of the vertices of the degenerate program dependence graph; and generating a procedure control program by arranging an instruction to execute a first one of the procedures after an instruction to wait for output data transfer from a second one of the procedures for the first and second ones of the procedures that have a dependence relation crossing a border between the basic blocks, generating an instruction to register dependence of a third one of the procedures on output data transfer from a fourth one of the procedures for the third and fourth ones of the procedures that have a dependence relation within one of the basic blocks, and generating an instruction to perform a given data transfer directly from procedure to procedure and an instruction to register dependence of the given data transfer on a preceding procedure for each of a data transfer within one of the basic blocks and a data transfer crossing a border between the basic blocks, wherein the generated procedure control program is to control execution of the procedures.

* * * * *